Aug. 21, 1962    R. C. MILES ETAL    3,049,978
GAGING AND MACHINE TOOL CONTROL
Filed Aug. 15, 1955    8 Sheets-Sheet 1
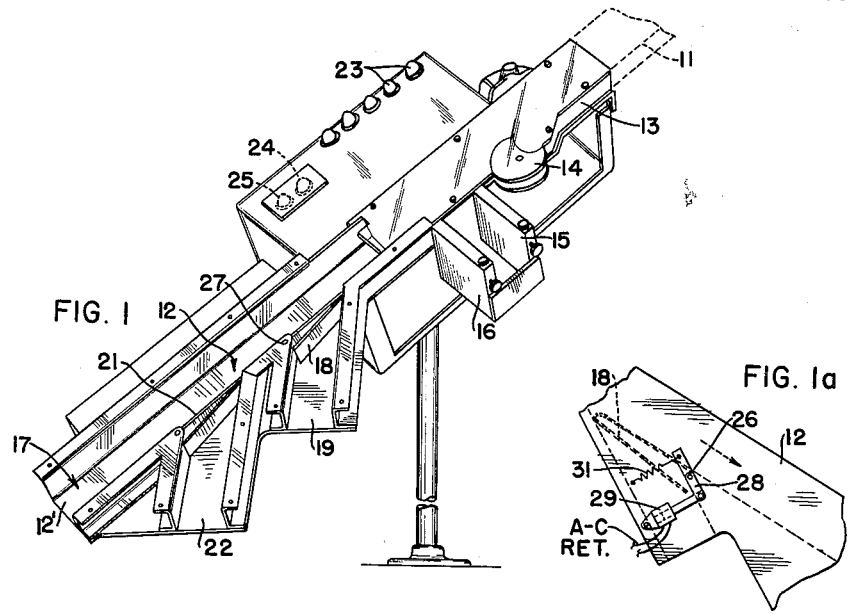
FIG. 1
FIG. 1a
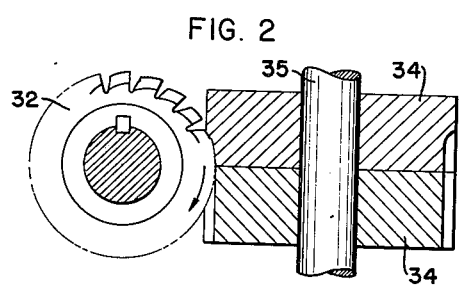
FIG. 2
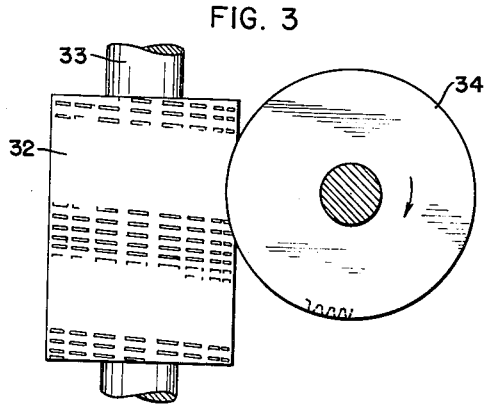
FIG. 3
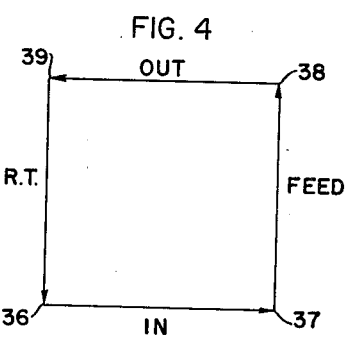
FIG. 4
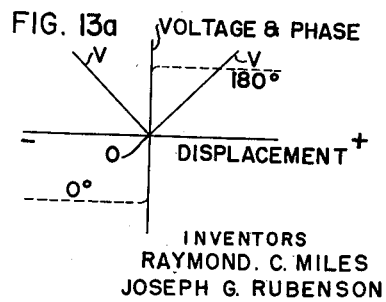
FIG. 13a
INVENTORS
RAYMOND C. MILES
JOSEPH G. RUBENSON
BY
ATTORNEYS Aug. 21, 1962 R. C. MILES ETAL 3,049,978
GAGING AND MACHINE TOOL CONTROL
Filed Aug. 15, 1955 8 Sheets-Sheet 2
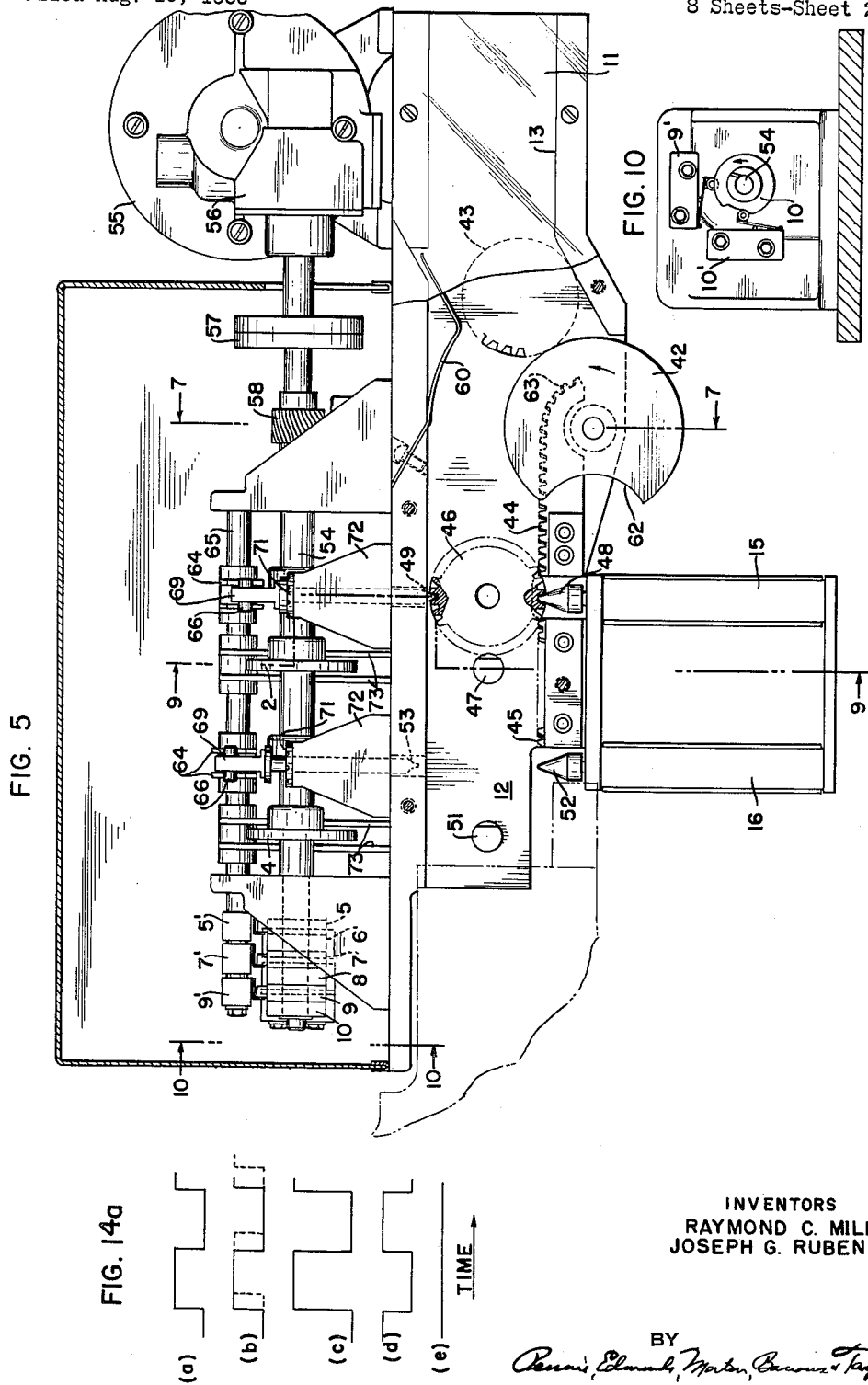
INVENTORS
RAYMOND C. MILES
JOSEPH G. RUBENSON
BY
ATTORNEYS Aug. 21, 1962  R. C. MILES ETAL  3,049,978
GAGING AND MACHINE TOOL CONTROL
Filed Aug. 15, 1955  8 Sheets-Sheet 3
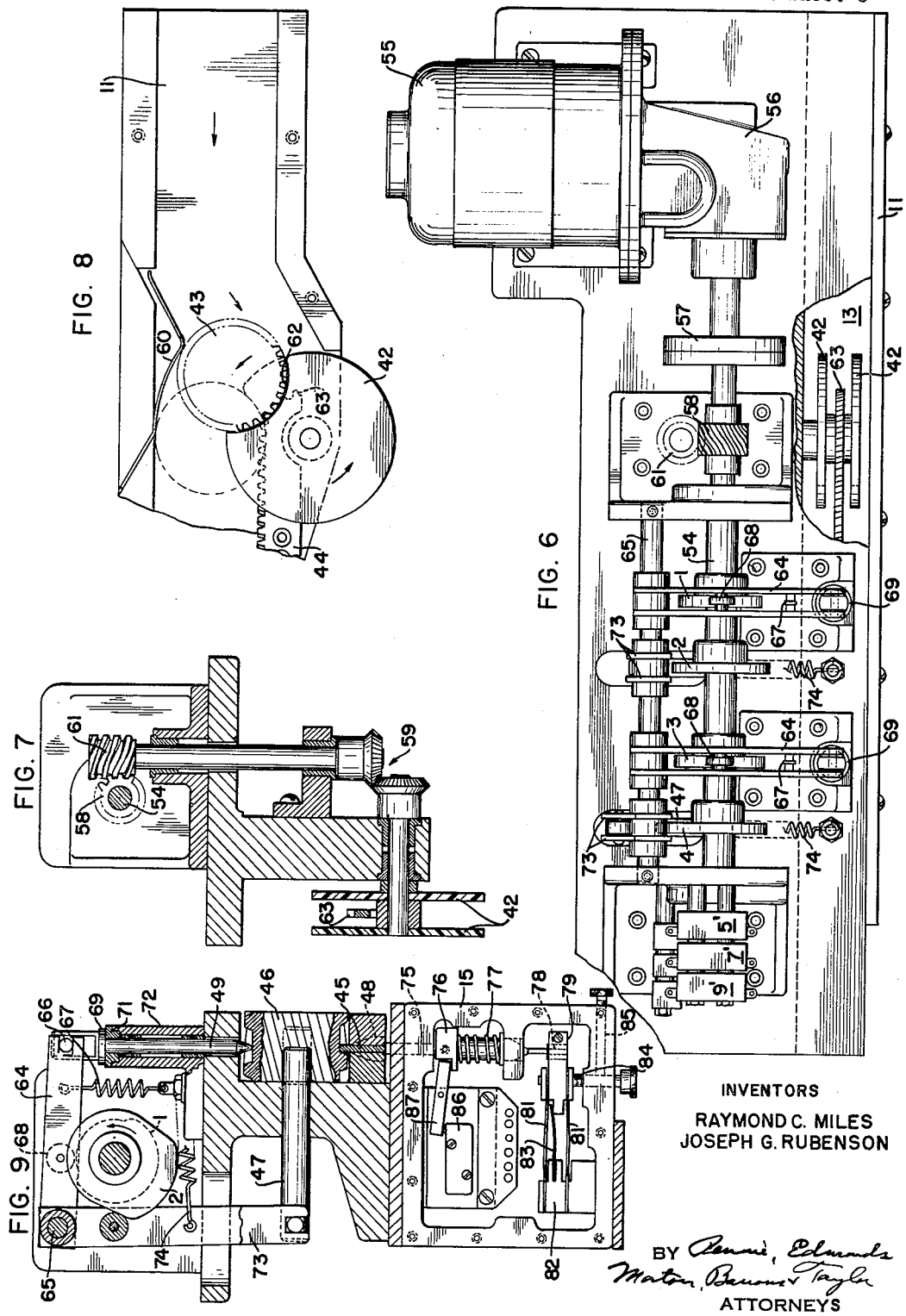
INVENTORS
RAYMOND C. MILES
JOSEPH G. RUBENSON
BY
ATTORNEYS Aug. 21, 1962  R. C. MILES ETAL  3,049,978
GAGING AND MACHINE TOOL CONTROL
Filed Aug. 15, 1955  8 Sheets-Sheet 4

INVENTORS
RAYMOND C. MILES
JOSEPH G. RUBENSON

BY
ATTORNEYS

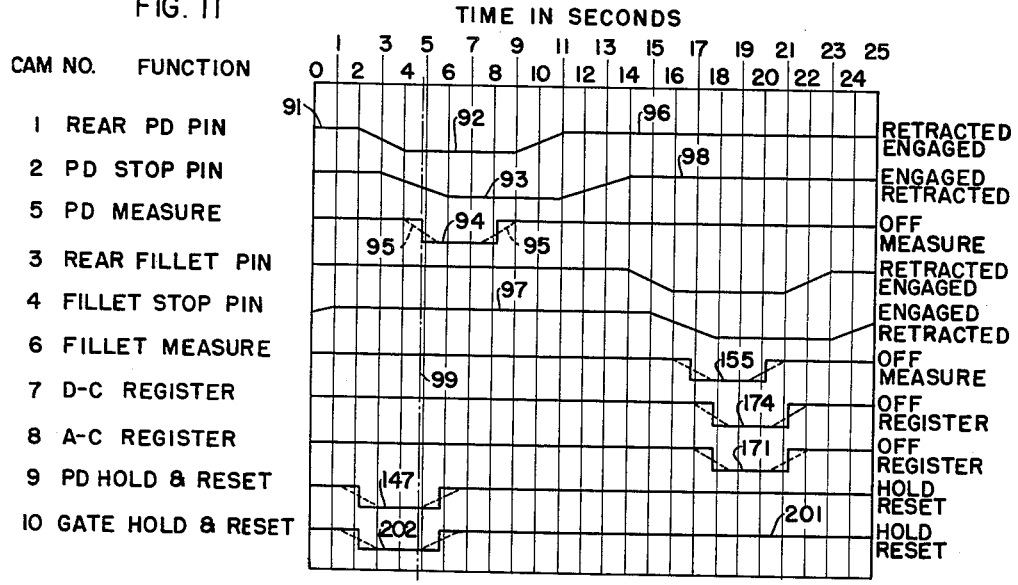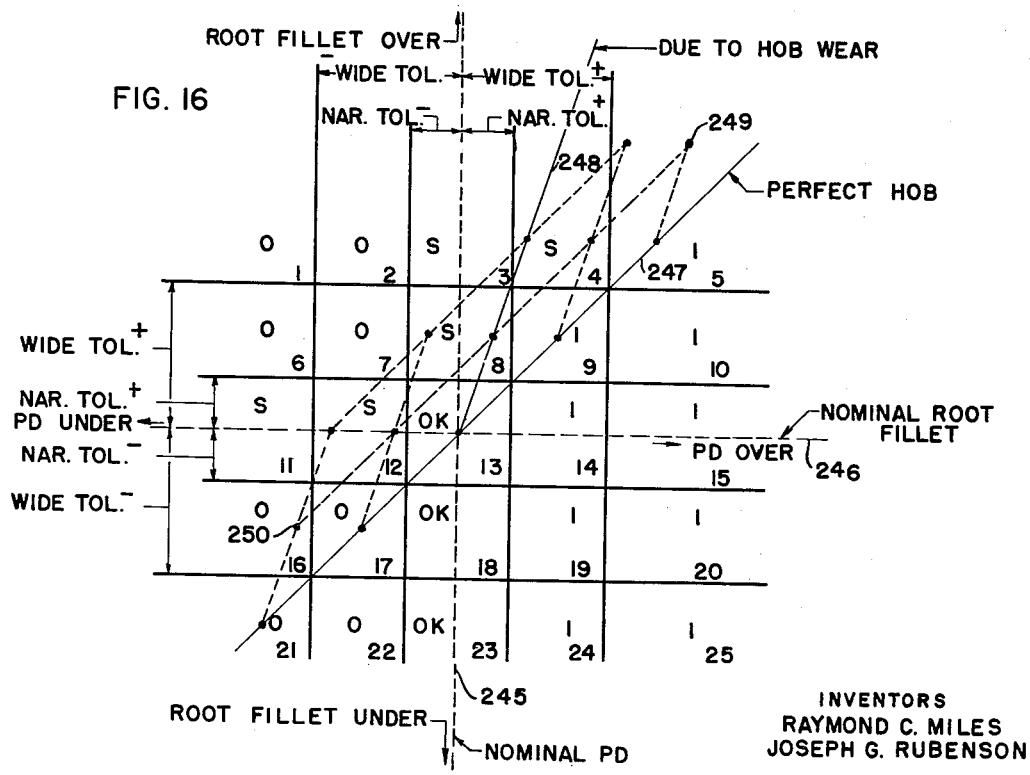

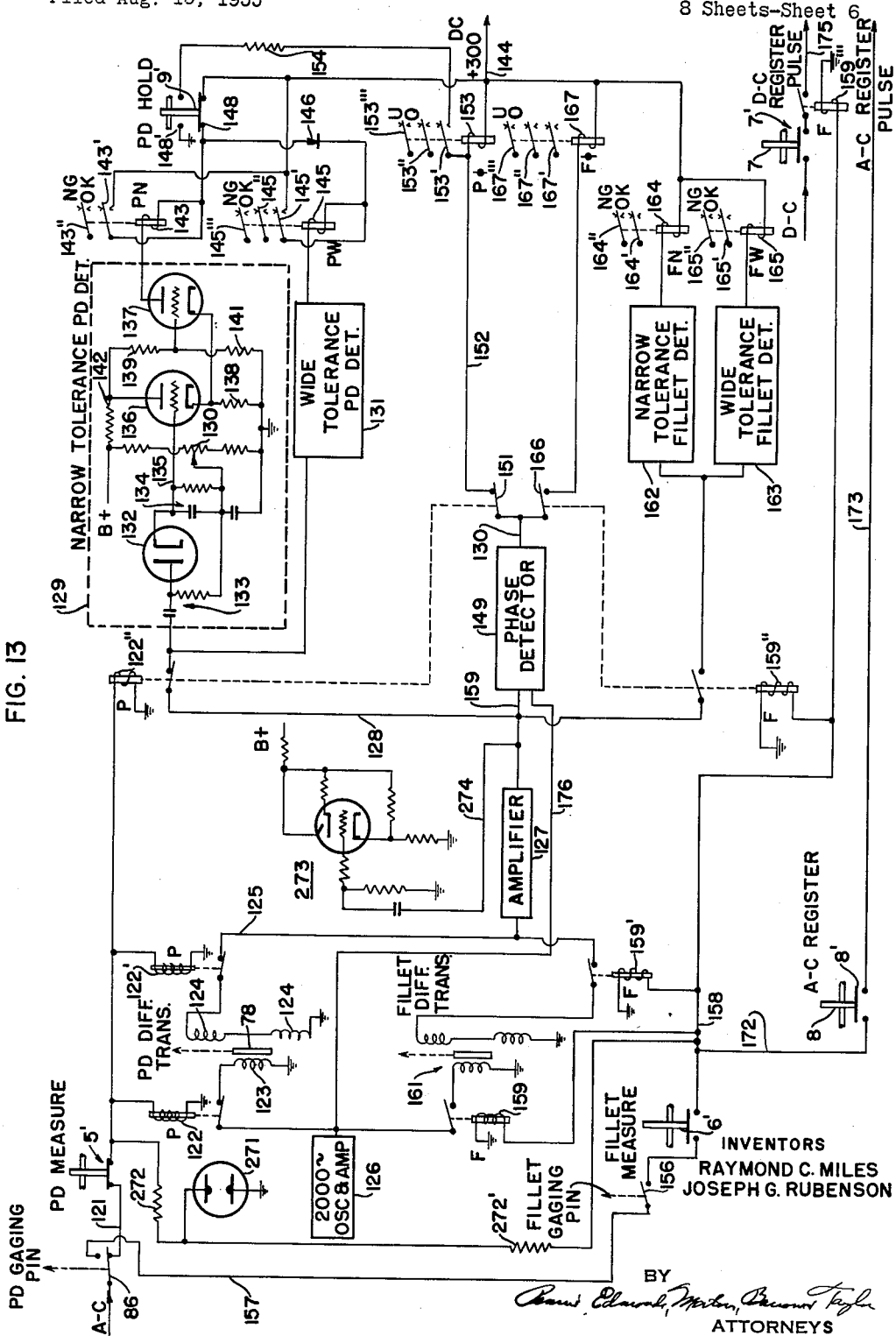

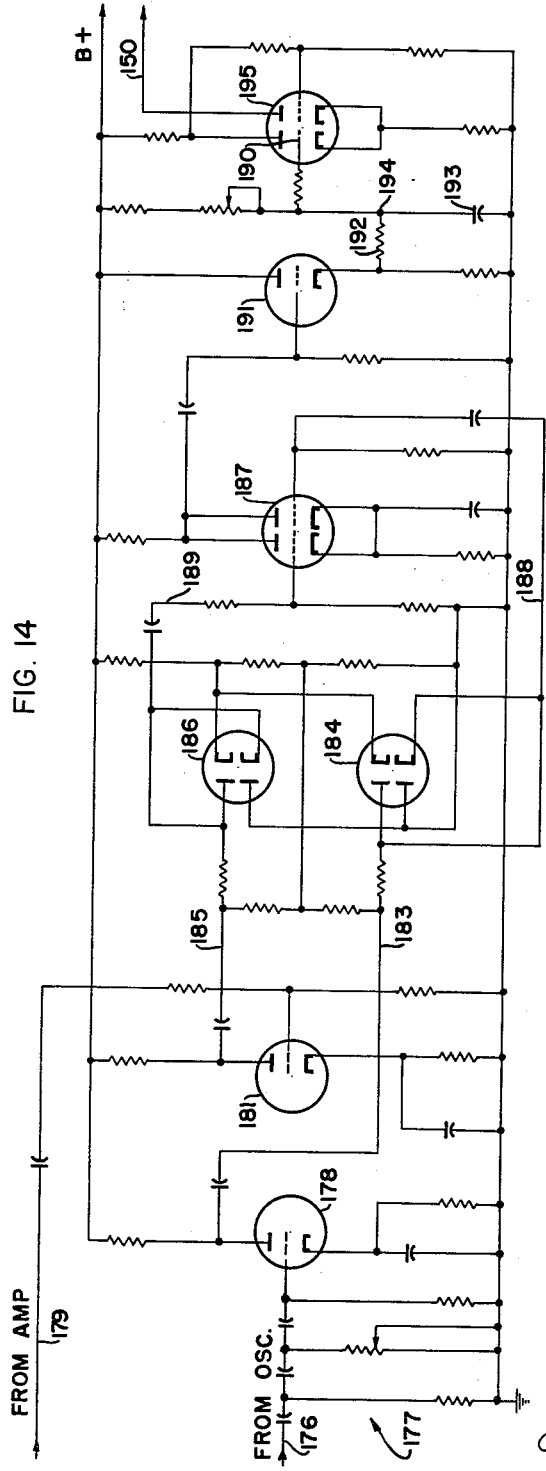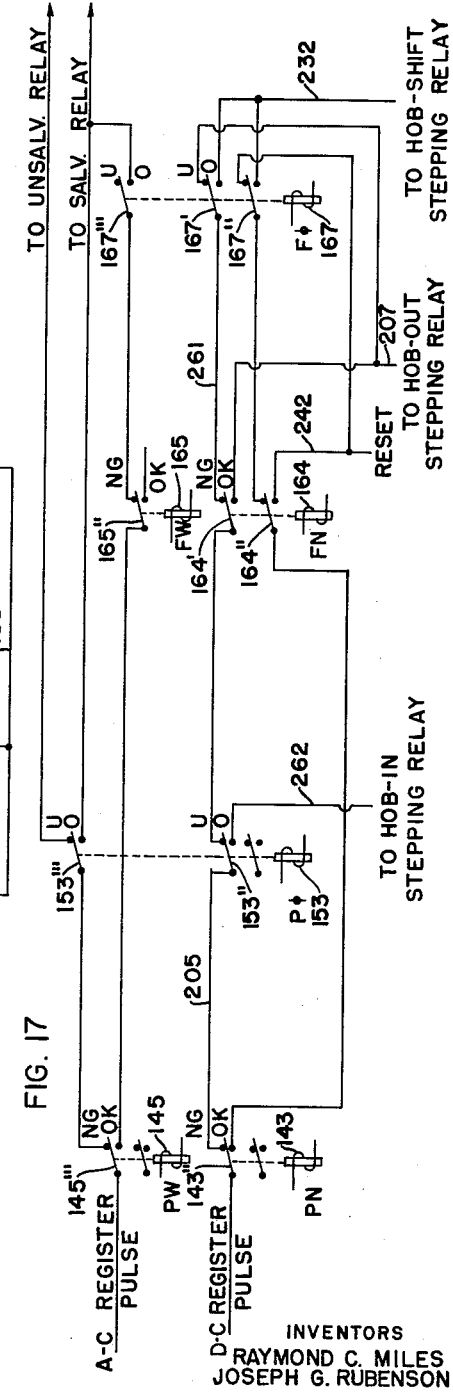

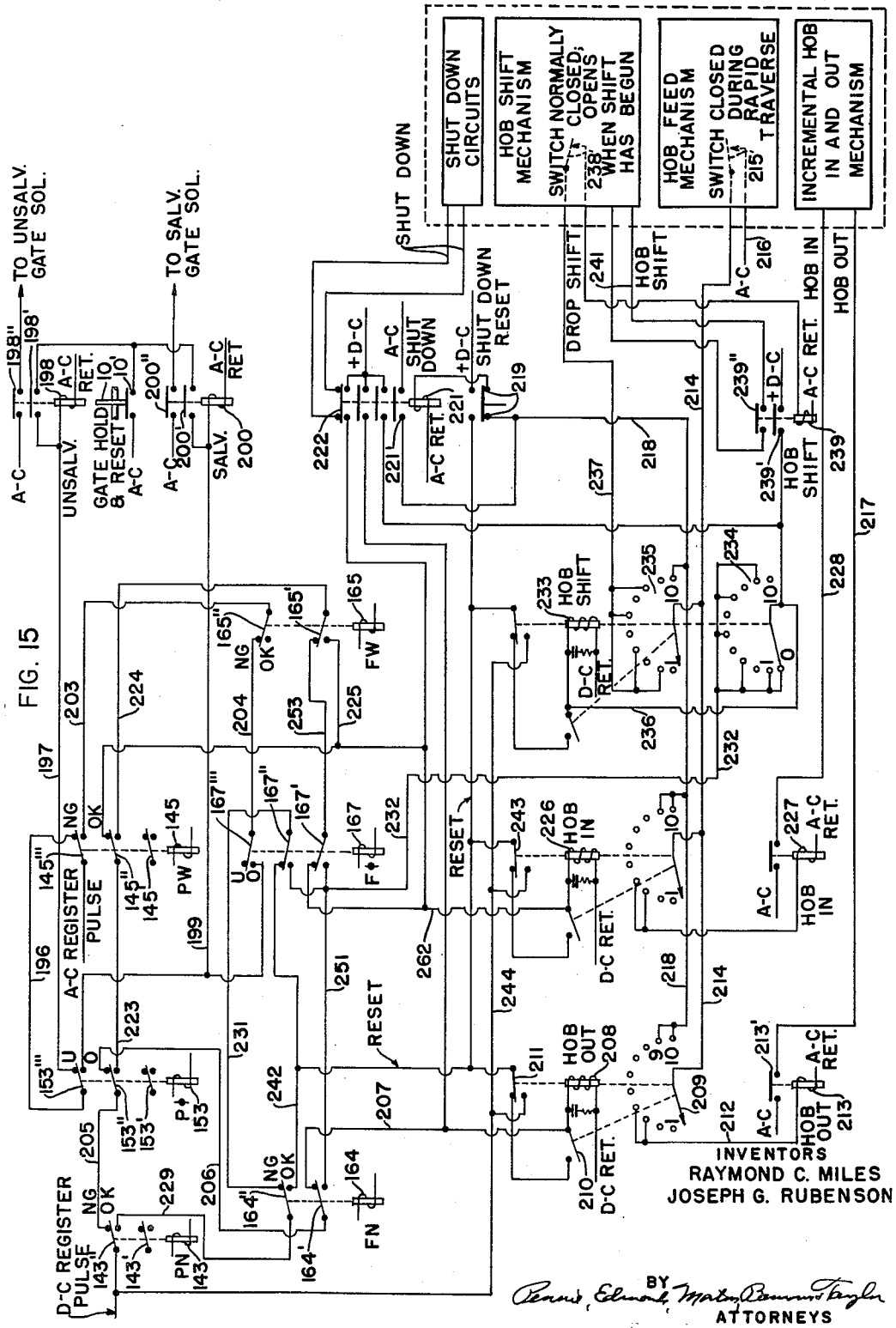

United States Patent Office 3,049,978
Patented Aug. 21, 1962

3,049,978
GAGING AND MACHINE TOOL CONTROL
Raymond C. Miles, Syosset, and Joseph G. Rubenson, Oceanside, N.Y., assignors, by mesne assignments, to Cutler-Hammer, Inc., Milwaukee, Wis., a corporation of Delaware
Filed Aug. 15, 1955, Ser. No. 528,252
31 Claims. (Cl. 90—4)

This invention relates to the automatic gaging and sorting of the output of a machine tool, and the automatic adjustment of the machine tool according to errors detected in its output. The invention is particularly directed to the gaging and sorting of gears, and the automatic adjustment of a hobbing machine, but many features are more broadly applicable.

Hobbing machines are widely used for making gears at high production rates. In such machines the cutting tool is a hob having cutting teeth arranged in the form of a helix. As the hob rotates, it is fed in the axial direction of the gear blank being cut, or at an angle thereto, and the gear blank is given a simultaneous rotation. By appropriate design and adjustment, such machines can be used to produce either spur gears or helical gears as well as other types.

With a perfect hob, the pitch diameter of the gear being cut varies with the separation between the hob axis and the workpiece axis. Unless this separation is accurately adjusted initially, and maintained in production, errors in pitch diameter will result. Gears having errors in pitch diameter are likely to be noisy, and may give rise to other difficulties in use. The noise problem is often serious, such as in automobile transmissions.

As the hob wears in use, errors in root diameter and clearance curve occur, as well as errors in pitch diameter and tooth shape. If the clearance curve is excessively oversize, that is, points thereof are too far from the gear axis, the gear will no longer mesh properly with a mating gear due to lack of clearance between the bottom of the tooth space and the tip of the mating gear.

Where the clearance curve joins the flank of a tooth a fillet is formed, and this is termed the "root fillet" herein. It has been found that the tips of the cutting teeth of the hob which form the root fillets are likely to show greatest wear, and hence it has been found that a measurement of the root fillet build-up is a fairly sensitive indication of hob wear. Of course, even with a perfect hob, if the separation of hob and gear blank or workpiece axes is too great, the root diameter will be excessive (clearance curve oversize) and improper meshing with a mating gear will result.

It is common practice to shift a hob after a number of gears have been cut so as to bring new cutting edges into service. If the hob is not shifted frequently enough, defective gears are produced. Also, excessive hob wear requires removing more metal in resharpening, thus reducing the total life of the hob, and may cause sufficient damage to require discarding. On the other hand, if the hob is shifted too frequently, the useful life of the hob is likewise reduced.

It will be realized that similar problems exist in gear grinding machines, which function much like hobbing machines except that the metal is removed by grinding instead of cutting. Also, similar problems exist in milling machines employed to cut gears, or formed wheel grinding machines which function similarly to milling machines except for grinding instead of cutting. In milling or formed wheel grinding, when the milling cutter or formed grinding wheel wears it must be sharpened, reformed or replaced, rather than shifted. However, most economical operation is obtained by cutting the maximum number of gears before resharpening, etc., without producing bad gears. Gear finishing machines likewise present problems similar to those discussed above.

Even with good operating procedures, machine tools are prone to produce occasional bad gears. The situation becomes much worse when there are errors in initial adjustment, worn tools are not shifted or replaced soon enough, or defects in machine tool operation arise. Thus inspection is desirable to assure quality production.

In accordance with the present invention a gear gaging unit is provided which is adapted to receive gears as they are produced by a machine tool, and gage desired dimensions thereof. As specifically employed, the gaging unit yields information as to variations in substantially the pitch diameter and as to variations in the clearance curve from predetermined nominal values. It is preferred to gage the fillet portions of the clearance curve for reasons discussed hereinafter. The indications obtained from the gaging unit are then applied to a computing unit which determines whether the gears are satisfactory or unsatisfactory, and controls suitable sorting means for segregating the gears into different categories. The indications from the gaging unit are also utilized by means of the computing unit to develop adjustment signals for making corresponding adjustments in the machine tool producing the gears.

The gaging unit contains a number of features to assure reliable delivery of the gears to the gaging station or stations in proper position for the gaging thereof, and for the accurate measurement of the desired dimensions at the gaging station or stations. These features will be discussed hereinafter in connection with the description of a specific embodiment thereof.

In sorting the gears information as to both pitch diameter and clearance curve is utilized to classify the gears into acceptable, unacceptable but salvageable, and unacceptable and unsalvageable categories. Generally speaking, if the defects in the unacceptable gears result from the removal of too much metal, reprocessing cannot correct the situation and the gears are considered unsalvageable. However, if too little metal has been removed, reprocessing may be expected to correct the defects and accordingly the gears are considered salvageable.

The gaging unit is capable of 100% inspection of the output of a machine tool, thus assuring the quality of the output. Furthermore, due to its rapid inspection the need for adjustment of the machine tool is made apparent before a large quantity of bad gears are produced.

Although sorting is important to assure quality, it is also considered important to control the operation of the machine tool so as to minimize the production of bad gears. To this end, in accordance with further features of the invention, the indications from the gaging unit are employed to develop adjustment signals for the machine too. The control unit specifically described is particularly adapted for the control of a hobbing machine, but it will be apparent that many features thereof are applicable to other types of machines for producing gears, and indeed to machine tools for producing other types of parts.

In controlling the operation of a hobbing machine, the information as to errors in pitch diameter and clearance curve are employed to develop adjustment signals for correcting the axial separation of hob and workpiece (hob-in or hob-out), and also for causing a hob shift.

It is particularly advantageous to shift the hob before it wears excessively. The wear of a hob in use depends upon many factors, and it is difficult to predict in advance just when a hob should be shifted or removed for resharpening or replacement. Therefore, in accordance with the invention, gaging means is provided which is sensitive to hob wear and this information is utilized to cause a hob shift automatically when actual wear indicates the need therefor. By basing the shifting on actual wear, the useful life of the hob may be greatly prolonged.

In order to secure gaging information sensitive to hob wear, it is preferred to gage the gear substantially at the root fillet. However, in some applications it may suffice to gage the gear at some other point on the clearance curve.

In order to make adjustments before unacceptable gears are produced, in so far as possible, the adjusting tolerances are advantageously smaller than the sorting tolerances. Thus, provision is made in the gaging unit to secure indications based on both wide and narrow tolerances. Generally, the wide tolerance indications alone are employed for sorting gears. It is possible to use only the narrow tolerance indications for the development of control signals. However, in accordance with a preferred embodiment of the invention, both wide tolerance and narrow tolerance indications are employed for this purpose.

It is preferred at the present time to make only one type of adjustment of the hobbing machine in response to a given defect or combination of defects observed in the produced gears, and to await the results of that adjustment before repeating the adjustment or making a different adjustment. Errors in pitch diameter or clearance curve may sometimes be due to errors in the axial separation of hob and gear blank, and sometimes due to a worn hob, so that the computing unit is designed to determine which adjustment is most likely to be needed. In some cases both types of adjustments are required and, in that event, the computing unit determines which adjustment should be made first.

It has been found that there is a somewhat random variation in pitch diameter and clearance curve from gear to gear even with a sharp hob and proper adjustment of the hobbing machine. Accordingly, the narrow tolerances used in the development of control signals are advantageously somewhat larger than the random variations encountered in the machine tool to be controlled. Furthermore, due to the random variations an occasional gear may be produced whose gaging indicates the need of hobbing machine adjustment, even though the hob is fairly sharp and the axial separation substantially correct. Therefore, in accordance with the present invention it is preferred not to make an adjustment of the hobbing machine until a plurality of gears have exhibited the same defect or defects. It is further advantageous to require two or more successive gears to exhibit the same defect or defects before making an adjustment. In the event that successive gears show different defects, or satisfactory gears intervene between gears exhibiting defects, provision is made to modify the information previously stored.

It is preferred to employ both automatic sorting and automatic control. However, either may be dispensed with in a given application.

Although the control unit specifically described is designed for the control of a hobbing mahcine, it may be modified to control machines of widely different types. For example, it may be adapted to control gear grinding and milling machines, and machine tools for producing other types of machine parts or pieces. Also, other types of gear gaging equipment may be employed to supply information to the control unit, and any suitable gaging equipment employed for other types of parts.

The invention will be more fully understood by reference to the following description of detailed embodiments thereof. Many additional features will be pointed out in the course of the description and further features will be obvious.

In the drawings:

FIG. 1 is an isometric view of the gear handling unit;

FIG. 1a is a detail of one sorting gate operating mechanism;

FIGS. 2 and 3 are vertcial and horizontal details illustrating the hobbing of a gear;

FIG. 4 is a diagram illustrating the movements of the hob in a conventional machine;

FIG. 5 is a plan view of the gear handling unit with covers removed and output chutes omitted;

FIG. 6 is a rear elevation of the apparatus of FIG. 5;

FIG. 7 is a cross-section of the gate wheel mechanism taken along the line 7—7 of FIG. 5;

FIG. 8 is a detail showing the operation of the gate wheel and associated mechanism;

FIG. 9 is a cross-section of the pitch diameter gaging mechanism taken along the line 9—9 of FIG. 5;

FIG. 10 is a cross-section showing the cam operated switches, taken along the line 10—10 of FIG. 5;

FIG. 11 is a timing diagram applicable to the apparatus of FIGS. 5–10;

FIG. 13 is a diagram principally of the gaging circuits;

FIG. 13a shows characteristics of a differential transformer;

FIG. 14 is a circuit diagram of the phase detector employed in FIG. 13 and FIG. 14a is explanatory thereof;

FIG. 15 is a diagram principally of the computer and control circuits;

FIG. 16 is a chart illustrating the control functions performed by the circuits of FIG. 15; and FIG. 17 is a modification of a portion of FIG. 15.

Figure 12:
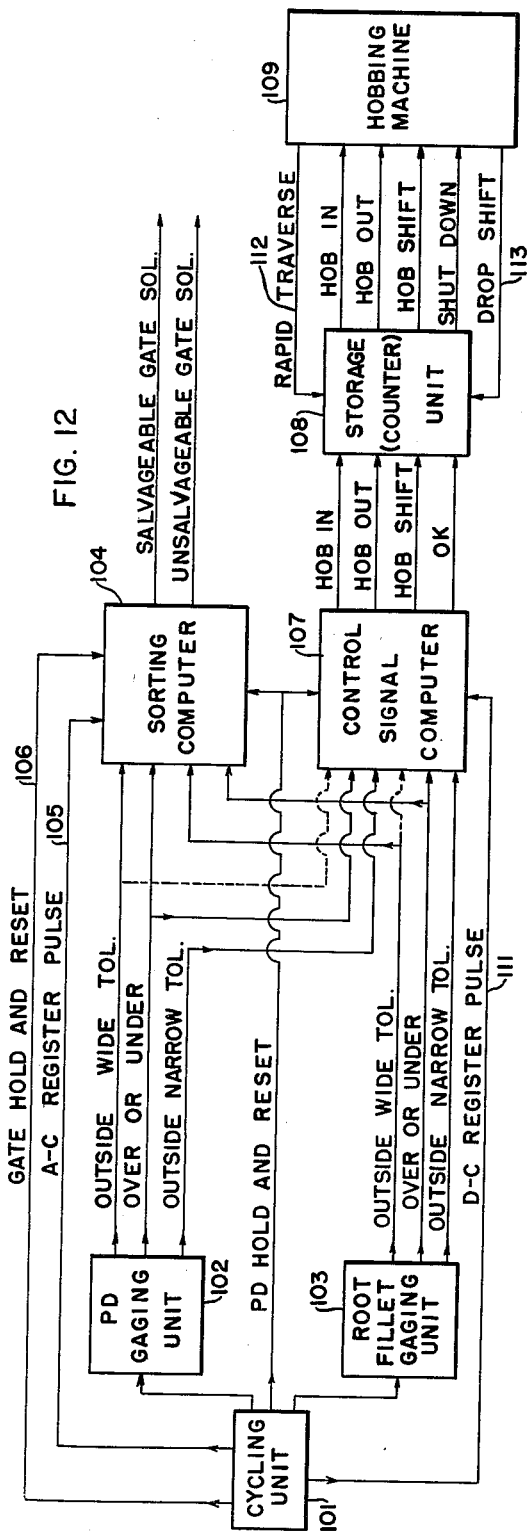
FIG. 12 is a block diagram illustrating the general functioning of the gaging, sorting and control units of the invention.

Referring now to FIG. 1, as gears are produced by a hobbing machine, they are fed into the upper end 11 of trough 12. The upper end is extended as necessary, and any suitable conveyor arrangement may be used to deliver the gears to the trough. It is preferred that the gears be delivered as rapidly as they are made, so that in the event the hobbing machine requires adjustment a minimum number of bad gears will be produced. The bottom 12' of the trough is advantageously inclined both longitudinally and transversely so that gears will tend to flow by gravity down the trough in contact with the lower side 13 thereof, but retarded by friction with the bottom 12'. A motor-driven gate wheel 14 is provided to feed the gears one by one to the gaging stations. In the specific embodiment here described, two gaging stations are provided, one for pitch diameter (PD) and the other for root fillet build-up. Gaging head 15 at the PD gaging station measures the departure of pitch diameter from a predetermined nominal value, and gaging head 16 at the fillet gaging station measures the departure of the root fillet from its nominal value.

As the measurements are made, the information is correlated by a computing unit to be described hereinafter, which determines whether the gears are acceptable, unacceptable but salvageable, or unacceptable and unsalvageable. If the gear is acceptable, it passes straight down the trough 12 to the exit 17, and drops into a bin or is conveyed elsewhere by suitable means. If unacceptable but salvageable, gate 18 is actuated across trough 12 and deflects the gear to trough 19. If unacceptable and unsalvageable, gate 21 deflects the gears down trough 22.

Lights 23 are provided to inform the operator of the various types of defects being detected. In one embodiment the lights are employed to indicate, respectively, (1) gear OK, (2) PD oversize, (3) PD undersize, (4) fillet oversize, (5) shut-down. In addition, a tuning eye 24 and a calibration light 25 are provided to facilitate initial adjustment of the nominal pitch diameter and root fillet. These are normally protected by a cover plate.

FIG. 1a indicates the operating mechanism for the salvage gate 18. The gate is fastened to an axle 26 which pivots in the trough structure at 27 (FIG. 1). Attached to the axle is a crank arm 28 pivoted to the plunger of gate solenoid 29. The solenoid is energized from the computer, as will be described. A spring 31 returns the gate to its inoperative position upon de-energization of the solenoid. The mechanism for the unsalvageable gate 21 is similar.

Referring now to FIGS. 2 and 3, the operation of a hobbing machine in cutting a spur gear is illustrated. The hob 32 has a large number of cutting teeth arranged in the form of a helix, and rotates about arbor 33 as an axis. The gear blanks 34 are mounted on a work arbor 35, which is driven in synchronism with the rotation of the hob. As here shown, two gears are being cut simultaneously.

FIG. 4 shows the operating cycle of the hob. Assuming a starting position 36, in this position the hob axis has been moved away from the work axis so that the hob cannot engage the gear blanks. It is then fed into position 37. At this point, the hob is out of engagement with the gear blank but the separation of the hob arbor 33 and work arbor 35 is such that the required depth of cut will be made. The hob is then fed upwards and begins cutting teeth in the gear blank. The rotation of the blank causes the hob to cut the initial portions of all teeth, and then the teeth are gradually lengthened as the hob is fed upwards to point 38. FIG. 2 illustrates the hob approximately midway between point 37 and 38. At point 38 the gear teeth have been cut in both blanks, and the hob is then moved out to position 39 and rapidly returned to the starting position 36. This portion of the cycle is commonly termed the "rapid traverse."

The separation of the hob and work arbors during the cutting portion of the cycle (between points 37 and 38) determines the pitch diameter of the resulting gears. Consequently, adjustable stops are ordinarily provided to establish the innermost position accurately. Although such stops are often set manually, there are known machines in which provision is made for an incremental in or out movement of the hob arbor by a motor driven mechanism. While such mechanism may take many forms, in one type a ratchet mechanism is employed operated by an electric motor to provide a predetermined small in or out movement upon actuation of a switch, and successive incremental in or out movements upon successive actuations of the switch. Since ordinarily it is undesirable to change the axial separation during the cutting portion of the cycle, interlocking means are povided so that the axial separation adjustment can be made only during the rapid traverse portion of the cycle.

After the hob has cut a number of gears, the cutting teeth become worn. The tips of the teeth commonly are subject to greatest wear and result in a build-up of the root fillet. Also, the sides of the cutting teeth tend to wear and may eventually result in errors in pitch diameter and shape of the teeth on the gear.

As illustrated in FIG. 3, the length of the hob is often such that only a portion of the cutting teeth is used in cutting a given gear. When the teeth become worn, the hob is then shifted in the axial direction so as to bring new cutting teeth into use for subsequent gears. Since the leading teeth on the hob commonly wear first, the amount of hob shift may be selected so that several successive shifts are required to bring an entirely new set of cutting teeth into service. After the hob has been shifted a number of times, determined by the incremental shift and the length of the hob among other factors, the hob is removed and resharpened.

In many hobbing machines the machine is shut down and the hob shifted manually on its arbor. However, machines are known in which the hob shift is perfomed by a motor-driven mechanism operated by closure of a switch. Many types of mechanism are possible, and in one type a ratchet movement driven by an electric motor is employed. A single closure of the switch results in a single incremental hob shift, and successive closures result in successive hob shifts. Interlocking circuits are provided so that the hob shift can take place only during the rapid traverse portion of the cycle.

The above discussion of hobbing machines is intended to give a sufficient understanding of the hobbing operation for purposes of the present invention. Hobbing machines vary widely in their design and construction. In some cases standard machines posses the necessary means for adjusting the axial separation and for effecting a hob shift so that the adjustment signals provided by the control unit of the present invention can readily be applied thereto with little modification. In other machines suitable provision for accepting the signals must be provided and such means will be obvious to those skilled in the art.

Referring now to FIG. 5, this figure is a view of a portion of the apparatus of FIG. 1 with cover plates removed to show the internal mechanism. The viewpoint for FIG. 5 is perpendicular to the inclined top of the apparatus of FIG. 1.

Due to the inclination of the trough 12 both longitudinally and laterally, gears entering at the upper end 11 roll down the trough along the lower side 13 until the leading gear lands against the gate wheel 42 which extends into the trough through the lower side 13. In the position of the gate wheel shown in FIG. 5, dotted gear 43 is prevented from travelling further. As the gate wheel 42 rotates, gears are fed forward one at a time to the measuring stations. Racks 44 and 45, in cooperation with the gate wheel, insure that gears will arrive at the stations in proper orientation. The operation of the gate wheel will be explained more fully in connection with FIG. 8.

In FIG. 5 the gear 46 is shown at the PD station in position for measuring the pitch diameter thereof. On arriving at the PD measuring station, the gear 46 first lands against a PD stop pin 47 which prevents it from rolling further down the trough. In performing the PD measurement, the gear is held between a front PD gagaing pin 48 and a rear PD gaging pin 49. Front pin 48 is mounted on the lower side of the trough and is biased to normally project into the trough.

The bias is conveniently obtained by a spring, as will be described in connection with FIG. 9, but other means for urging the pin 48 to its forward position (e.g., magnets) may be employed if desired. The tip of the gaging pin 48 is positioned to take the place of a tooth on the rack. That is, if racks 44 and 45 were considered to be a continuous rack, one tooth on the rack would be cut out and replaced by gaging pin 48. To prevent interference of the racks with the PD measurement, a tooth on each side of pin 48 is preferably removed. Thus pin 48 is spaced from adjacent rack teeth by approximately an integral multiple (including one) of the rack tooth spacing. Due to this construction a gear rolling down rack 44 in mesh therewith will be stopped at the PD gaging position with front pin 48 in mesh with the gear.

Rear PD pin 49 is normally retracted by a cam and associated mechanism which will be described in connection with FIG. 9. However, when the PD measurement is to be made, rear pin 49 projects into the chute against a positive stop or anvil which insures that pin 49 will have a fixed forward position during measurement. Due to the feeding of the gear by rack 44 and the location of stop pin 47, the gear will be oriented so that as rear pin 49 moves forward, it lodges in the space between two teeth. The shape of front and rear pins 49 is such as to engage the gear substantially at its pitch diameter. With rear pin 49 in its forward position, the gear 46 is pressed against front pin 48 and the displacement of pin 48 is utilized to measure the pitch diameter. In the present embodiment a differential transformer is employed for measurement, which will be described hereinafter.

Figure 9B:
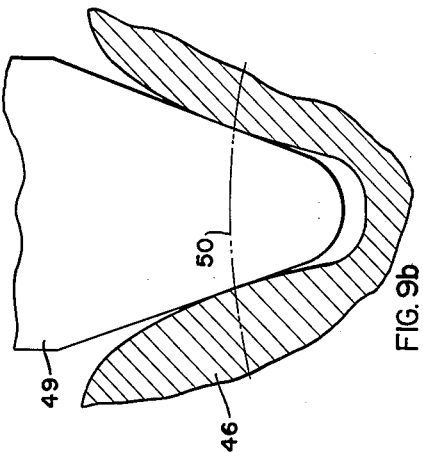
FIGS. 9a, 9b and 9c are details for explaining the dimensions gaged.
Figure 9C:
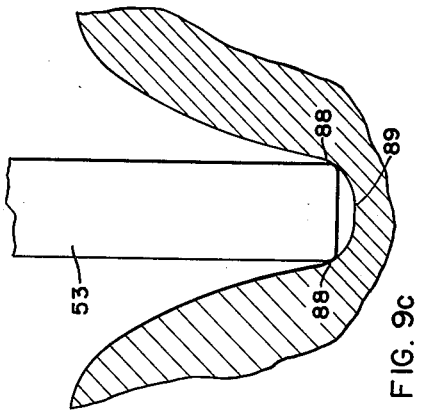
Figure 9A:
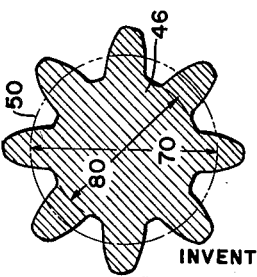

Referring for a moment to FIGS. 9a and 9b, FIG. 9a shows a cross-section of gear 46 illustrating the approximate position of the pitch circle 50. The diameter of the pitch circle, termed the "pitch diameter," is denoted 70. The diameter at the bottom of the tooth space is often termed the "root diameter" and is denoted 80. FIG. 9b shows the rear PD gaging pin 49 lodged between adjacent teeth of gear 46 and contacting the active surfaces of the teeth substantially at the pitch diameter. The front PD pin 48 lodges between teeth substantially at the pitch diameter also.

While it is desirable to shape the pins to engage the gear at the pitch diameter, it is possible to shape them to make contact outside of the pitch diameter, or even somewhat inside, and still obtain a measurement which is responsive to variations in substantially the pitch diameter. This is because measurements at some other points on the active surfaces will in general vary as the pitch diameter varies. Sometimes such a measurement can be mathematically related to the pitch diameter. However, this is ordinarily not required since the gaging head may be adjusted with a standard gear of acceptable characteristics so that departures in whatever specific diameter is being gaged will indicate errors in production.

Furthermore, while departures from an actual diameter, or approximately a diameter, are measured in the specific embodiment shown, it would be possible to measure the radius of the pitch circle, or other circle in the region of the pitch circle, or the distance between such a circle and a fixed point of reference, etc., in order to obtain an indication which varies substantially with the pitch diameter.

It will be understood that terms such as "pitch diameter" and "gaging means responsive to variations in substantially the pitch diameter" are used herein with the foregoing discussion in mind.

Referring back to FIG. 5, in measuring the pitch diameter, it is desirable that gear 46 be out of contact with the stop pin 47 and held only between the gaging pins, so that an accurate measurement can be obtained. This can be accomplished by retracting stop pin 47 before the measurement is made. However, to avoid possible damage to the gaging pins in seating prior to full retraction of the stop pin, and yet insure that a gear will be reliably held in position until measured, in this specific embodiment the stop pin 47 is only partially retracted at the time the measurement takes place, and pins 48 and 49 are located so that gear 46 is rolled backwards slightly by the forward movement of pin 49, thus holding the gear out of contact with the stop pin 47.

In the embodiment shown, gears with an even number of teeth are to be measured and pins 48 and 49 are diametrically opposite each other with respect to a gear being gaged. For gears with an odd number of teeth, the single rear gaging pin 49 may be replaced by a double pin designed to slip over one tooth of the gear and engage opposite sides of that tooth at the pitch diameter. Or, for many purposes it suffices to displace the single pin 49 slightly, or lengthen it slightly, so that it slips between two adjacent teeth of an odd-toothed gear slightly off the diameter thereof, with appropriate reshaping of the pin if necessary.

After the pitch diameter has been measured, rear pin 49 is retracted, allowing the gear to roll down to the fillet gaging station where it is retained by the fillet stop pin 51. The measurement of the root fillet then takes place in the same manner as described for the PD measurement. The front fillet pin 52 is positioned to serve as a tooth of rack 45 if the rack were considered to be extended. Rear fillet pin 53 moves forward against a positive stop to engage the gear and press it against the front pin. The shape of one or both of the fillet measuring pins 52, 53 is different from that of the PD gaging pins, since it is desired to measure the amount of fillet build-up. In the specific embodiment here shown, the front fillet pin 52 has the same shape as front PD pin 48. However, the rear fillet pin 53 has a narrow tip which will lodge between the teeth close to the bottom thereof. The tip is flat so that it engages the root fillets, thereby making the measurement quite sensitive to fillet build-up.

Referring for a moment to FIG. 9c, points 88 denote approximately the inner points of the active surfaces of the gear teeth. The portions of the active surfaces between points 88 and the pitch circle are the "flanks" of the teeth. The curve joining the flanks and bounding the bottom of the tooth space is termed the "clearance curve." In FIG. 9c this is the curve 88–89–88. The "fillet" is the portion of the clearance curve joining the flank to the bottom of the tooth space, and lies in the region of point 88. As shown, rear fillet gaging pin 53 is designed to engage these fillets.

As mentioned before, it is preferred to gage the clearance curve substantially at the fillets in order to obtain a sensitive indication of hob wear. However, as the hob wears other portions of the clearance curve will change also, and it is possible to gage other portions if desired, and shape the gaging pin accordingly.

As in the case of obtaining a response which varies with pitch diameter, in connection with the gaging of the clearance curve it is possible to gage a diameter, or a radius, or the distance of the clearance curve from some other point which is sufficiently fixed in practice to yield an indication which varies with changes in the clearance curve.

The specific embodiment shown is somewhat in the latter category. Having the front fillet pin 52 land substantially at the pitch diameter of the gear and only the rear pin 53 land on the root fillet makes this measurement somewhat a composite of pitch diameter and fillet build-up. However, the measurement is still responsive to root fillet build-up and is found in practice to be satisfactory. If desired the front pin 52 can likewise be shaped to land substantially at the root fillet.

When the term "oversize" is used herein in connection with the clearance curve or root fillet measurement, it is intended to mean that the portion of the clearance curve being gaged is farther away from the gear axis than the predetermined nominal value.

The spacing of pins 48, 52 and the number of rack teeth therebetween may be selected for a gear with a given number of teeth so that the fillet and pitch diameter measurements are made along the same diameter of the gear, or along diameters having a desired relative angle therebetween. It is preferred in the present embodiment to make both measurements along the same diameter, so that more certain correlation of the gaging indications in the computing unit can be obtained. To this end the spacing of pins 48, 52 is made equal to one-half the circumference of the pitch circle of the gear being gaged, or an integral multiple thereof, and the number of rack teeth selected so that a gear makes one-half a revolution, or an integral multiple thereof, in passing from the first station to the second.

Upon completion of the fillet gaging, rear pin 53 is retracted and, since fillet stop pin 51 has already been retracted during the gaging, the gear rolls down the trough and passes out through either the main trough or the side troughs, depending upon the positions of the sorting gates as explained in connection with FIG. 1.

The sequence of operation of the gaging and stop pins is controlled by cams on the cam shaft 54 driven by motor 55 through suitable reduction gearing 56, and slip clutch 57. In the embodiment here shown, the cam shaft makes one revolution in 25 seconds but the speed can, of course, be changed to meet the requirements of the output of the hobbing machine with which it is employed. Slip clutch 57 is provided to avoid serious damage in case of jamming. The gate wheel 42 is also driven through a gear 58 on the same shaft. The timing of the cams is shown in FIG. 11 and will be discussed hereinafter. In the electrical circuitry, certain switches are required to operate in timed relationship to the cam-operated pins already described, and this is accomplished by providing additional cams 5–10 on cam shaft 54, with associated switches 5′–10′. In this specific embodiment, six switches are employed and, to provide mounting room, three of them, (5′, 7′, 9′) are positioned side-by-side behind the cam shaft, as shown in FIG. 5, and the other three below the sam shaft, as will be clear from FIGS. 6 and 10.

Referring now to FIG. 7, gate wheel 42 is driven through bevel gears 59 by spiral gear 58 on the cam shaft 54, gear 58 meshing with spiral gear 61. As specifically shown, the ratio between cam shaft 54 and gate wheel 42 is 1:1.

The operation of the gate wheel in feeding gears is illustrated in FIG. 8. The gate wheel is provided with a segmental cutout 62 into which a gear may roll by gravity when the gate wheel has rotated to face the entrance end 11 of the trough. In the position shown in FIG. 5, the gate wheel prevents a gear from passing through. However, as the segmental cutout 62 rotates to the position shown in FIG. 8, the gear 43 rolls into the cutout portion. Thereupon the gear is moved upwards against gravity due to the inclination of the trough and gate wheel (see FIG. 1) which makes the plane of rotation of the gate wheel extend upwards from the horizontal.

The rack 44 is curved at its end 63 to extend partially around the axis of the gate wheel on the entrance side thereof. Thus, as gear 43 is moved upwards by the gate wheel, it will mesh with the rack. If initially unmeshed, the upward movement will tend to cause the gear to rotate about its own axis until it does mesh with the rack.

To further insure that the gear cannot pass through the gate without becoming meshed with the rack, a spring 60 may be provided. The configuration of the spring is advantageously selected so that if the gear 43 is in mesh with the rack, it will just clear the spring in its forward progress. However, if the gear is not in mesh, the upper periphery thereof bears against the spring and is retarded. The continued feed at the lower periphery of the gear by the gate wheel causes a relative rotation of the gear so that it falls into mesh with the rack.

As specifically constructed, the gate wheel comprises two similar axially-separated sides having matching cutouts (see FIGS. 6 and 7), so that the rack can extend around the axis between the sides. This construction prevents the gear from skewing as it is fed forward and is preferred. However, in some applications the rack could extend alongside the gate wheel if desired.

The gate wheel and curved rack as described has been found highly advantageous to assure delivery of the gears to the gaging stations in mesh with the rack. The spring additionally assures proper operation, but in some cases can be dispensed with if desired.

While the gate feeding mechanism just described has been found very satisfactory in use, and is preferred, other forms of feeding mechanism can, of course, be employed if desired. Also, instead of relying upon gravity, other means for feeding the gears to the gate can be employed.

Referring now to FIG. 9, gear 46 is shown at the PD gaging station and the rear PD pin 49 is in its forward measuring position. Pin 49 is retractable by arm 64 pivoted on the stationary shaft 65 and connected to the rear end of pin 49 by a pin and slot connection 66. The spring 67 biases the pin 49 to its forward position and cam 1 engages cam follower 68 to move the pin to its retracted position.

In order to establish a precise forward position of pin 49 for measurement purposes, the shaft of the pin is provided with a collar 69 which abuts the hardened machined insert 71 which is precisely mounted in portion 72 of the housing. Insert 71 hence serves as a positive stop or anvil. Also, since the pin 49 is moved to its forward position by spring 67, possible injury to the mechanism due to malformation of a gear being gaged is minimized.

PD stop pin 47 is connected to arm 73 by a pin and slot connection, and arm 73 is pivoted at its other end to stationary shaft 65. The arm is biased to its stop position by spring 74 and is retractable by cam 2 engaging a cam follower on arm 73. In the position shown, the stop pin 47 is partially retracted and the dotted lines indicate the extremes of its travel.

The mechanism for controlling the operation of the rear fillet pin 53 and fillet stop pin 51 is similar except for the timing of the cams.

Front PD measuring pin 48 is mounted in a gaging head unit 15 shown with its cover removed. The pin projects from the gaging head unit through the lower side of the trough into position to engage a gear being measured. It is conveniently formed as a hardened point attached to rod 75 sliding in bearings in the housing of head 15. A block 76 is pinned to rod 75 and biased by spring 77 so that pin 48 normally projects into the trough. When a gear is being gaged, the forward movement of rear pin 49 presses the gear against front pin 48 and causes the rod 75 to move away from the trough by an amount determined by the pitch diameter of the gear being gaged.

On the opposite end of rod 75 is the movable core 78 of a differential transformer whose coils are contained in housing 79. The differential transformer is well-known and many forms are available. The type used in this specific embodiment has a primary coil coaxially arranged between two secondary coils and the latter are connected in opposition. The primary and secondary coils are fixed in the housing, and movement of the core 78 from its central position increases the coupling between the primary and one coil of the secondary, and decreases the coupling to the other. The coil housing 79 is mounted between flat metal strips 81 secured ot the housing at 82 and biased by spring 83 toward the adjusting screw 84. Thus the transformer housing can be moved toward or away from the trough to adjust for zero output at the predetermined nominal pitch diameter of the gear to be gaged. Locking screw 85 clamps adjusting screw 84 in position.

As will be apparent hereinafter, the PD measurement takes place at a given point in the cam shaft cycle. The gager is ordinarily in continuous operation when the hobbing machine is running, and the cycle of operation is ordinarily faster than the rate at which gears are produced. There may also be interruptions in production. Accordingly, sometimes a PD measuring interval is reached without a gear being in position to be gaged. To prevent false actuation of the control circuits, switch 86 is placed in series with the gaging circuits. The switch is open when the gaging pin 48 is in its forward position, but is closed when the pin 48 is forced backwards by a gear. To this end lever arm 87 engages a projection on block 76 at one end, and the actuating button of the switch at its other end. As here shown, when the button on switch 86 is depressed the switch contacts are opened, and when block 76 moves backwards the button is released to close the contacts.

FIG. 10 shows an end view of the cam-operated switches. As will be explained hereinafter, switches 9′ and 10′ are similarly timed. Hence, cam 9 has the same configuration as cam 10 but it is displaced 90° about shaft 54.

FIG. 11 shows the relative timing of the various cams and switches. In this particular embodiment one cycle takes 25 seconds and accordingly the various intervals are indicated with reference to zero seconds representing the time when a given gear passes the gate wheel and rolls down to the PD gaging station. At this instant the rear PD pin 49 is retracted, as indicated at 91. Thereafter cam 1 allows the rear PD pin to move forward into engagement with the gear, as indicated by line 92. In the meantime, cam 2 begins to retract the PD stop pin 47, and the pin is fully retracted in the interval 93. As the PD stop pin is being retracted, cam 5 actuates switch 5′ to the PD measure interval 94. The dotted lines 95 indicate approximately the shape of the cam surfaces. The actuation of the switch 5′ occurs somewhere in the travel of the cam follower from "off" to "measure" positions, and vice versa, and the actuation is here shown to take place approximately halfway in the movement of the cam follower. The associated circuitry is such that slight changes in the points at which the switches operate are permissible so that no critical adjustments are involved.

When the PD measuring interval ends, the rear PD pin is retracted as shown by line 96, thus allowing the gear to roll to the fillet gaging station where it is held by the fillet stop pin 51 which is then in its forward stop position as indicated by line 97. Then the PD stop pin moves forward, as indicated by line 98, so as to be ready to receive the next gear to be gaged.

The same sequence is repeated for the rear fillet pin, fillet stop pin and fillet measure switch, except at later intervals. The remaining portions of the timing diagram will be referred to after the electrical circuits have been discussed.

Throughout the drawings, when it appears significant, the positions of the various pins and switches are shown at the beginning of the PD measuring interval, as indicated by the dot-dash line 99.

Before proceeding to a detailed discussion of the circuits for developing sorting and control signals, the block diagram of FIG. 12 will be described to give an overall idea of the functioning of the various units.

In FIG. 12 box 101 includes the cycling cams 1–10 and switches 5′–10′ described previously, together with appropriate energizing circuits. Certain cams and switches control the operation of the PD gaging unit 102 and fillet gaging unit 103. The particular type of transducer employed in gaging may be selected as desired, and a number of different types are known in the art. It is preferred at the present time to employ differential transformers.

The PD gaging unit 102 includes appropriate circuits for yielding output indications as to whether the pitch diameter is within-tolerance or outside-of-tolerance. It is preferred to employ both wide and narrow tolerance limits and accordingly corresponding outputs are shown in FIG. 12. Indications as to whether the measurement is oversize or undersize is also supplied by the PD gaging unit. While in the present embodiment a separate signal for oversize and undersize is developed, such indications could be combined with the tolerance indications to yield over-wide-tolerance, under-wide-tolerance, etc. signals.

Similarly, the root fillet gaging unit 103 supplies outside-wide-tolerance, outside-narrow-tolerance and over or undersize signals as indicated. Although gaging units 102 and 103 are shown entirely separate, portions of one unit may be employed in the other if desired.

The sorting computer 104 contains appropriate circuit means utilizing the indications from the gaging units to determine whether gears are acceptable or unacceptable. If unacceptable, it also determines whether the gears are salvageable or not. To this end, the wide tolerance indications and over or undersize indications are supplied to sorting computer 104.

As described in connection with FIG. 1, three troughs are available for sorting gears into appropriate categories. Since one trough is straight through, only two gates are required to perform the sorting. Consequently, only two outputs from sorting computer 104 are required. If desired, one of the gates could be operated for acceptable gears and the other gate for one of the categories of unacceptable gears, with both gates remaining closed for the other unacceptable category. Suitable alterations in the sorting circuits can be made to effect this result.

In the specific embodiment herein described, the pitch diameter and root fillet build-up are gaged successively, and the pitch diameter is gaged first. In order to hold the PD information until the root fillet information has been obtained, a PD hold and reset circuit is operated by the cycling unit 101 and supplies an appropriate signal to the sorting computer 104 and control signal computer 107. Also, to insure that the sorting gates will not be operated until all necessary information is received, the sorting computer 104 is arranged to set up circuits for operating the gate solenoids, and the circuit setup for a given gear is energized by a register pulse from the cycling unit 101 through line 105 to the computer 104. The cycling unit is arranged to deliver the register pulse only after the completion of the fillet gaging.

The cycling unit also establishes a suitable gate hold and reset circuit through line 106 to the sorting computer, so that if a given gate solenoid is energized it will remain energized sufficiently long to divert the particular gear to the appropriate trough.

The narrow tolerance indications, and over and undersize indications, are supplied to the control signal computer 107. If desired, only these signals can be employed for control purposes. However, for reasons given hereinafter, it is preferred to employ the wide tolerance indications also for control purposes, and these connections are shown in dotted lines.

In the control signal computer suitable signals are developed according to the gaging indications to determine whether the hobbing machine is in need for adjustment. These signals correspond to hob-in, hob-out and hob-shift.

As previously explained it is preferred to require that more than one gear exhibit the need for a given adjustment before the adjustment is actually made. Therefore the signals from the control signal computer are supplied to a storage or counter unit 108. If the desired number of gears exhibit the need for a given correction, the corresponding signal is supplied to the hobbing machine 109.

To avoid developing signals on incomplete information, the control signal computer 107 is designed to set up circuits corresponding to the different types of adjustments, and the circuit thus set up is energized by a register pulse from the cycling unit through line 111. Furthermore, in order to reduce the count of a given counting unit when a satisfactory gear arrives, an "OK" signal is supplied from computer 107 to storage unit 108. Provision is also made in unit 108 to reduce the count for a given type of adjustment if a subsequent gear indicates the need for a different adjustment.

In order to prevent adjustment of the hobbing machine while the hob is in engagement with the workpiece, a suitable circuit 112 is controlled by the hobbing machine so that adjustment signals are supplied from unit 108 to the hobbing machine only during the rapid traverse portion of the hobbing machine cycle. Also, to prevent more than one shift of the hob in response to a single shift signal, interconnections are made between hobbing machine and storage unit 108 through line 113 to break the shift adjustment signal circuit when the hob shift has started.

If the gaging unit is designed to gage both pitch diameter and root fillet simultaneously, the PD hold and reset circuit can be dispensed with. Also, if the fillet is gaged first, the hold and reset circuit can be modified to hold the fillet measurement until the PD measurement has been made.

Referring now to FIG. 13, circuits for developing the measuring indications are shown. In this and subsequent drawings, "A.-C." refers to an alternating current voltage which may conveniently be ordinary 60-cycle 115 volt power line voltage. The D.-C. in the relay circuits may conveniently be developed from the A.-C. It is preferred to employ A.-C. operated relays where possible. However, the stepping relays employed are presently available only for D.-C. operation. If desired, D.-C. operated relays can be employed throughout, or A.-C. operated relays throughout if they are available in the proper types. In circuits employing amplifier tubes, B+ refers to ordinary plate circuit power supply voltage. Cathode heater circuits are omitted for convenience of illustration.

In FIG. 13 A.-C. is supplied to the arm of switch 86 which is closed by a gear in the PD gaging position. The circuit continues through line 121 to cam operated switch 5' and thence to the actuating coils of relays 122, 122', and 122''. For convenience of illustration, three separate actuating coils are shown, with their associated switch arms and contacts. However, in practice, a single actuating coil and the requisite number of sets of contacts will be employed. Since it is assumed that a gear is at the PD gaging station and that the PD measuring interval determined by cam 5 has just begun, the relays 122, etc. are shown in their actuated positions.

The PD differential transformer has a primary 123 and a pair of secondary coils 124, the latter being connected in phase opposition. When alternating current is applied to the primary, corresponding voltages are induced in the secondary coils. If the core 78 is centered, the voltages will be equal and of opposite polarity, giving zero output voltage in line 125. However, if the core is displaced from its central position in either direction, more voltage will be induced in one coil than in the other and the net voltage will be applied to line 125. With proper design, the output voltage can be made substantially linear with displacement throughout a useful range. FIG. 13a shows representative voltage curves V for displacements on either side of the central position represented by "O."

As the core moves from one side of zero to the other, the phase changes very rapidly by 180°. This is indicated by the dotted line of FIG. 13a. Accordingly, for equal displacements on either side of the central position, equal voltages will appear in the output circuit but they will differ in phase by 180°. In the present embodiment advantage is taken of this to determine not only the magnitude of deviation from nominal pitch diameter and root fillet, but also to indicate whether the dimensions are oversize or undersize.

Referring back to FIG. 13, the primary 123 of the PD differential transformer is energized from a source of voltage 126 through the closed contacts of relay 122. Source 126 may be of any convenient design. For example, a 2,000-cycle Wien bridge oscillator followed by an amplifier has been found satisfactory. The output of the differential transformer is supplied through the closed contacts of relay 122' and line 125 to amplifier 127. This amplifier is designed to amplify the frequency of source 126. Any suitable design may be employed, an amplifier having considerable negative feedback and cathode follower output being found advantageous for stable amplification. The output of amplifier 127 is supplied through line 128 and the closed contacts of relay 122'' to the input circuit of a narrow tolerance PD detector 129 and a wide tolerance PD detector 131.

Detector 129 comprises a detector for developing a D.-C. control voltage which varies in amplitude with the amplitude of the applied alternating voltage, followed by an amplitude-responsive switching circuit which will switch from one condition of operation to another according to whether the output of the detector is less or greater than a predetermined value. Many such circuits are known in the art and may be employed at the discretion of the designer.

In the circuit here shown, a diode 132 is connected as a peak detector. The incoming wave is supplied through an R-C coupling circuit 133 to the diode anode, and a shunt R-C load circuit 134 is connected to the cathode. The output of the detector is supplied through line 135 to the grid of triode 136.

Triodes 136 and 137 are connected as a so-called "Schmitt" trigger circuit. This is a bi-stable trigger circuit, that is, the conducting tube is determined by the potential of line 135 and remains conducting so long as the potential persists. Cathodes of tubes 136, 137 are connected together and then to ground through a cathode coupling resistor 138. The plate of tube 136 is D.-C. coupled to the grid of tube 137 through resistors 139 and 141. Plate voltage for tube 136 is supplied from B+ through load resistor 142. The actuating coil of relay 143 is included in the anode circuit of tube 137 and plate voltage is obtained from the D.-C. line 144 under control of cam-operated switch 9'.

An adjustable bias for the grid of tube 136 is obtained through a voltage divider from B+ to ground which includes potentiometer 130. When a signal is applied to the diode detector, the detector output is positive and adds to the positive voltage (to ground) determined by the setting of potentiometer 130.

The overall functioning of the trigger circuit is that, in the absence of an input signal to the diode, tube 137 is conducting and tube 136 non-conducting. The voltage drop in cathode resistor 138 due to cathode current of tube 137 applies a positive bias to the cathode of tube 136. The setting of potentiometer 130 is such that the grid of tube 136, under these conditions, is sufficiently less than the cathode potential so that the tube is cut off. When an incoming signal of sufficient magnitude arrives, the D.-C. output of the diode detector circuit, when added to the bias from potentiometer 130, makes the grid of tube 136 sufficiently positive to overcome the positive cathode bias and cause the tube to begin to pass current. The resulting decrease in anode potential is fed to the grid of tube 137 and causes current in the latter tube to decrease. The effect is cumulative and takes place very rapidly. Thus, with a signal of sufficient magnitude, tube 136 becomes conducting and tube 137 non-conducting.

The magnitude of signal required to flip the trigger circuit from one condition to the other is adjustable by potentiometer 130. The magnitude of the signal, in turn, is determined by the movement of the core of the differential transformer from its central position and hence by the departure of the pitch diameter of the gear from its nominal value. Thus, the tolerance may be set by potentiometer 130. A regulated power supply is employed for the oscillator 126 and the power supply for the PD detector 129 so that the tolerance, once set, remains substantially unchanged with power line voltage.

Cam-operated switch 9' is shown in its reset position corresponding to the beginning of the PD measuring interval (see FIG. 11). If the pitch diameter of the gear is within the tolerance set by potentiometer 130, tube 137 is conducting and relay 143 energized. This results in moving the switch arms 143', 143'' to their lower positions, indicating that the gear is within tolerance. The lower position is therefore labelled "OK."

If the gear is outside of the tolerance set by potentiometer 130, tube 137 becomes non-conducting and relay 143 is de-energized. Thus the switch arms move to their upper position as shown, and this position is labelled "NG" to indicate that the gear is outside of tolerance.

It is desirable to adjust the hobbing machine before gears are produced whose pitch diameter is outside a predetermined maximum tolerance. Accordingly, two PD detectors are provided which are identical except for the adjustment of the potentiometer 130. The wide-tolerance PD detector 131 has its potentiometer set to a wide tolerance beyond which a gear must be rejected. The narrow tolerance detector 129 has its potentiometer set to give a smaller tolerance limit for controlling the hobbing machine.

Wide tolerance detector 131 has relay 145 in its output circuit which functions similarly to relay 143. In some cases it is found that a gear falls outside of the narrow tolerance but within the wide tolerance, so that relay 145 will remain energized, but relay 143 will be de-energized. The rapid cutting off of current in the actuating coil of relay 143 may cause transients which might momentarily reduce the voltage applied to relay 145 and cause false actuation thereof. To prevent this, a rectifier 146 may be inserted in the lead to relay 145. Although shown as a single rectifier, in practice it has been found expedient to employ several crystal rectifiers in series, shunted by high resistances.

The PD measurement is made before the fillet measurement and both readings are combined both for sorting and control purposes. According the PD information must be retained until the fillet measurements have been made. Various forms of hold circuits for relays 143, 145 are possible and that shown has been found advantageous. The lower switch arms 143', 145' participate in the hold circuit. The lower contacts for these switch arms are connected together and lead to the B+ supply 144. Thus if either relay is energized, say 143, the corresponding arm 143' assumes its lower position and establishes a circuit from B+ through the actuating coil to the plate of tube 137. Thus, at the termination of the PD reset and the opening of the contacts 148 of cam-operated switch 9', B+ voltage continues to be applied to tube 137 and the tube remains conducting to energize relay 143.

If the pitch diameter is outside of the narrow tolerance and tube 137 is rendered non-conducting to de-energize relay 143, the cutting off of signal to detector 129 at the end of the PD measuring interval would cause tube 137 to revert to its conducting stage if B+ continued to be applied. It will be noticed from FIG. 11 that the PD reset interval shown by line 147 terminates partway through the PD measuring interval shown by line 94. Accordingly, cam-operated switch 9' moves to its upper position before the PD measuring interval is over. This breaks the B+ circuit through the contacts 148 of the switch and removes B+ from tube 137 unless relay 143 is in its actuated condition to establish the hold circuit through the lower contact of arm 143'.

To determine the phase of the output of the PD differential transformer, the output of oscillator 126 and of amplifier 127 is fed to the phase detector 149. The circuit of the phase detector is shown in FIG. 14 and will be described hereinafter.

During the PD measuring interval, switch arm 151 is in the closed position illustrated and supplies the output of the phase detector through line 152 to the PD phase relay 153 (denoted Pφ). B+ voltage is supplied to the phase detector from source 144 through the actuating coil of relay 153 and the closed contacts of switch 151. The arrangements are such that if the pitch diameter is oversize, relay 153 is energized and pulls the corresponding arms 153', 153" and 153''' to their lower position designated "O." If the pitch diameter is undersize, the relay 153 is de-energized and the switch arms assume their upper position as shown. This position is labelled "U."

The position of the phase relay 153 is determined near the beginning of the PD measuring interval. If the phase is such that relay 153 is de-energized, the breaking of the circuit by switch arm 151 at the end of the PD measuring interval will insure that relay 153 remains unenergized. However, if the relay is energized, it will establish a circuit through resistor 154 to the upper contacts of cam-operated switch 9'. When switch 9' moves to its upper position, partway through the PD measuring interval, a circuit will be established through contacts 148' which grounds the upper end of resistor 154. Accordingly, a circuit is established from D.-C. source 144 through the actuating coil of relay 153 and the resistor to ground, which maintains the relay energized after the opening of switch 151. Prior to the next cycle of operation, cam-operated relay 9' returns to the position shown so as to break this hold circuit.

Operation of the fillet measuring circuit is similar except for the timing. After the PD measuring interval is over, and the gear has rolled to the fillet gaging station, fillet measurements are made during the interval shown by line 155 in FIG 11. During this interval cam 6 closes the switch contact 6' (FIG. 13). With the gear in fillet measuring position, switch 156 is closed. Since, however, there is no gear at the PD gaging station, switch 86 in the PD gaging head moves to its upper position and supplies A.-C. through line 157 and the closed switch contacts to line 158. Accordingly, fillet relays 159, 159', 159" and 159''' are energized. This supplies the output of oscillator 126 to the primary of the fillet differential transformer 161 and the output of the transformer is supplied to amplifier 127.

The closing of the contacts of relay 159" supplies the output of the amplifier to the narrow tolerance fillet detector 162 and wide tolerance fillet detector 163. The circuitry in these detectors may be identical with that shown in the PD detector 129, but the corresponding tolerance potentiometers may be set differently as meets requirements. The actuating coil of narrow tolerance fillet relay 164 remains energized if the fillet is within the narrow tolerance, but is de-energized if the fillet is outside of the narrow tolerance. The corresponding positions of switch arms 164' and 164" are therefore labelled "OK" and "NG," respectively. The same applies to the wide tolerance fillet relay 165.

The actuation of relay 159" also closes the contacts 166, connecting the phase detector 149 to the fillet phase relay 167 (Fφ). This operates in the manner previously described for the PD phase relay 153.

Since the correlation of information as to pitch diameter and fillet may take place as soon as the fillet relays have been operated, it is unnecessary to provide hold circuits for these relays. The settings of the PD and fillet relays determine the disposition to be made of the gears and the development of the control signals for the hobbing machine.

Suitable energization for the circuits set up by the PD and fillet relays is supplied during so-called "register" intervals. As above pointed out, in this embodiment A.-C. is employed to operate the sorting gates but D.-C. is employed to operate stepping relays for developing the adjustment signals. Accordingly, partway through the fillet measuring interval, cam-operated switch 8' closes, as indicated by line 171 in FIG. 11. Since fillet switches 156 and 6' are still closed, A.-C. is supplied through line 172, the then-closed contacts of switch 8' to the line 173, accordingly supplying an A.-C. register pulse to the computing unit (FIG. 15). Similarly, the closing of switch 7' by cam 7, indicated by line 174 in FIG. 11, supplies D.-C. through the closed contacts of relay 159''' to line 175, thus providing a D.-C. register pulse for the computer unit (FIG. 15).

In setting up and checking the gaging unit in operation, a convenient way of adjusting the differential transformers to desired nominal values of pitch diameter and root fillet is to feed a master gear through the two gaging stations and adjust the differential transformer for zero amplifier output at each station. To facilitate this adjustment, an indicator light circuit is provided to inform the operator when the gear is in proper position, and a so-called "tuning eye" circuit is provided to indicate zero amplifier output.

In FIG. 13 the indicator light 271, which may conveniently be a neon light, is connected through similar resistors 272 and 272' to the outputs of the measuring switches 5' and 6'. The other terminal of the neon light may be grounded. When the master gear is fed to the PD gaging station, indicator light 271 will glow when the PD measuring switch 5' is closed. Feed motor 55 (FIG. 5) is then stopped. The tuning eye circuit 273 obtains its input from the output of amplifier 127 through line 274. The tuning eye circuit is of fairly conventional type employing a type 6U5 tube. A.-C. coupling is employed and the "eye" will open to its maximum for zero input. Accordingly, the adjusting screw 84 (FIG. 9) is turned until the tuning eye indicates zero amplifier output. Then clamping screw 85 is tightened.

The feed motor is then restarted to feed the gear to the fillet gaging station, and lamp 271 will again glow when fillet measuring switch 6' closes. The motor can then be stopped and the fillet differential transformer adjusted until the tuning eye indicates zero output from amplifier 127.

The circuit diagram of phase detector 149 is shown in FIG. 14. The output of oscillator 126 is supplied through line 176 and a phase shifting circuit 177 to the grid of amplifier 178. Amplifier 178 is shown as a thermionic triode, but other amplifier tubes can be employed if desired. The output of the amplifier 127 is supplied through line 179 to the grid of amplifier tube 181 through a suitable coupling circuit. The output of amplifier 178 is supplied through line 183 to a double diode 184 connected to operate as a limiter and thereby convert the amplified 2,000 cycle sine wave from the oscillator into a substantially square wave of constant amplitude. Similarly, the output of amplifier 181 is supplied through line 185 to a double diode 186 which functions as a limiter to convert the 2,000 cycle sine wave output of the amplifier 127 into a substantially square wave form of constant amplitude.

The diode limiting circuits are symmetrical, and their square wave outputs are of substantially the same shape and amplitude for considerable difference in the amplitudes of the input waves from the oscillator 126 and amplifier 127. This is assured by first considerably amplifying the input waves so that the sine waves applied to the diodes 184, 186 always greatly exceed the desired amplitude of the output square waves. As will be apparent hereinafter, it is unnecessary to determine the phase of the output of the differential transformers unless the output exceeds the established narrow tolerances. If under these conditions the sine wave output of the amplifier greatly exceeds that of the oscillator, a resistance voltage divider may be placed in the input of amplifier 181 as indicated.

The functioning of the amplifier and diode squaring circuits in FIG. 14 is well known to those skilled in the art and need not be described further.

Vacuum tube 187 serves as an adder. To this end the square wave corresponding to the oscillator wave is supplied through line 188 to the grid of the second section, and the square wave corresponding to the amplifier output is supplied through line 189 to the grid of the first section. Cathode bias is employed and the two anodes are connected together and the output supplied to the grid of tube 191.

If the square waves are in phase at the grids of tube 187, the output will be a square wave of considerable amplitude. On the other hand, if the square waves are 180° out of phase, there will be little or no A.-C. output fed to tube 191. The purpose of the phase shifting circuit 177 is to insure that the square waves applied to the grids of tube 187 will either be substantially in phase or substantially 180° out of phase. The signal from the oscillator which passes through the differential transformer and the amplifier 127 to the phase detector passes through a number of circuits which may result in a phase shift. This is, of course, in addition to the phase shift caused by the operation of the differential transformer to either side of zero. To take these extraneous phase shifts into account, phase shifting circuit 177 is designed to provide suitable compensation, and suitable adjustments may be provided for initially obtaining the proper phase relationship.

Tube 191 serves as a detector and the output is taken from the cathode and supplied to an R–C integrating circuit 192, 193. From the foregoing discussion, it will be apparent that the detector output at point 194 will be small when the two square waves are 180° out of phase, but will have a considerable positive D.-C. component when the square waves are in phase. The two sections of tube 195 are coupled as a Schmitt trigger circuit and the operation of this circuit has been described in connection with PD detector 129. Positive bias is applied to the grid 190 of the first tube section by an adjustable voltage divider from B+. With small output from detector 191, the bias potential of grid 190 is substantially lower than the cathode potential of that section so that the first section is cut off and the second section is conducting. The D.C. output of detector 191 under in-phase conditions, however, drives grid 190 sufficiently positive to trigger the circuit to its other operating condition wherein the first section is conducting and the second section is non-conducting.

Whether the conduction condition of the second section represents oversize or undersize depends upon the relative phase of the input voltages from oscillator and amplifier and either condition can be obtained by suitable manipulation of circuit constants. As here employed, the operation is such that when the measurement is oversize, the seconnd section of tube 195 is conducting and the associated relay in its plate circuit (153 or 167, FIG. 13) is actuated.

FIG. 14a illustrates the principle of operation of the adder 187. Curve (a) represents the voltage applied to the grid of the first section from the double diode 186. The full curve in (b) shows the wave applied to the grid of the second section from the double diode 184, for the in-phase condition. Curve (c) illustrates the resultant added wave in the output of tube 187. The dotted curve at (b) illustrates the square wave somewhat lagging with respect to its preferred position. This can be corrected by adjustment of the phase shifting circuit 177. Curve (d) illustrates the out-of-phase condition of the square wave applied to the second section of tube 187. When combined with curve (a), the A.-C. output of tube 187 is approximately zero, as indicated by the straight line (e).

It will be understood that the wave forms shown in FIG. 14a are idealized and that in practice considerable variation is possible. Simple diode clipper circuits as illustrated are not perfect limiters, particularly when signals of widely different amplitudes are fed to it, as is the case with the signal fed to the upper double diode 186. Also, perfect in-phase or out-of-phase matching is ordinarily not required. The important feature in the specific circuit of FIG. 14 is that the voltage of point 194 be sufficiently different for the in-phase and out-of-phase conditions to cause positive operation of the switching circuit.

Referring now to FIG. 15, the several PD and fillet relays shown in FIG. 13 are reproduced along with their switch arms. However, the circuits actuating the relay coils and the hold circuits associated with the lower arms of the PD relays are omitted to avoid undue complexity. For convenience in understanding the operation, the relays are designated "PN," "Pφ," "PW" to indicate the narrow tolerance PD relay, the PD phase relay and the wide tolerance PD relay, respectively. Similar legends "FN," "Fφ," "FW" have been applied to the fillet relays.

The portions of the circuit employed in sorting gears will be described first. The A.-C. register pulse (FIG. 13) is supplied to the arm 145''' of wide tolerance PW relay 145. In the position shown, the relay indicates that the gear is outside of the wide tolerance and the A.-C. pulse passes through line 196 to arm 153''' on the Pφ phase relay 153. In the position shown, the phase indicates that the gear is undersize. Accordingly, the A.-C. pulse passes through line 197 to the unsalvageable relay 198. This actuates the relay and closes the contacts thereof. The upper contacts 198'' supply A.-C. to the unsalvageable gate solenoid discussed in connection with FIGS. 1 and 1a. This opens the unsalvageable trough 22 and the gear is deflected therethrough.

If, however, the gear is outside of the wide tolerance but is oversize, Pφ relay 153 is energized and the A.-C. pulse goes through the oversize line 199 to the salvageable relay 200. This closes the upper contacts 200'' and supplies A.-C. to the gate solenoid 29 associated with gate 18 (FIG. 1) and deflects the gear down the salvageable trough 19.

The actuation of either of the gate relays 198 or 200 establishes a hold circuit. Considering relay 198, actuation of the relay closes the circuit from the top of the actuating coil through contacts 198' to cam-operated switch 10'. Referring for a moment to FIG. 11, the gate relays 198, 200 will be operated during the A.-C. register interval indicated by line 171. At this time the gate hold and reset cam 10 operates its corresponding switch 10' to the hold position indicated by line 201. The hold position is with the contacts of switch 10 closed (FIG. 15) and consequently supplies A.-C. to the actuating coil of relay 198. This hold circuit persists until shortly after the beginning of the next cycle, whereupon switch 10' opens during the reset interval 202 (FIG. 11). The breaking of the hold circuit de-energizes relay 198 and consequently the gate solenoid is de-energized and the gate returns to the position indicated in FIG. 1.

A similar operation obtains for the salvageable gate relay 200.

Returning now to PW relay 145, if the gear is within the wide tolerance, the A.-C. register pulse passes through the OK line 203 to arm 165'' of FW relay 165. If that relay is energized to the OK position, the gear is satisfactory and neither gate opens, allowing the gear to pass down the acceptable trough. However, if the fillet is outside of tolerance, the A.-C. register pulse passes through line 204 to the arm 167''' of the Fφ relay. If the relay is de-energized, indicating that the fillet is undersize, the gear is acceptable and neither gate solenoid is energized. However, if the Fφ relay is energized to its oversize position, the gear is unsatisfactory but salvageable. Accordingly, the A.-C. register pulse passes through line 199 to the salvageable relay 200.

Considering now the development of adjustment signals for the hobbing machine, as before mentioned it is preferred at the present time to require several gears to indicate the need for a given adjustment before that adjustment is made, due to random variations from gear to gear, and even from tooth to tooth, in the output of a hobbing machine. To this end counting means are employed to count the number of gears indicating the need for a given adjustment. While different forms of counters may be employed, a mechanical counter of the stepping relay type has been found advantageous. If, after one or more gears have indicated the need for a given adjustment, and then a gear arrives which is satisfactory or indicates the need for a different adjustment, provision is made to step back the previously actuated counter. As specifically described, the previously actuated counter is reset to zero.

It has been found satisfactory at the present time to require that three successive gears require a hob-in or hob-out adjustment before the respective adjustment is made. However, in the case of a hob-shift it is preferred to make the shift when only two successive gears show the need therefor, since continued use of a badly worn hob may result in damage to the hob or require excessive resharpening.

Repeated adjustments of either axial separation or hob shift may be made. However, in the specific embodiment herein described, if a single hob-in or hob-out adjustment does not suffice to correct the situation at least temporarily, and a sufficient number of additional gears are produced which indicate the need for the same adjustment, the hobbing machine is shut down. In the case of hob shift, since ordinarily several shifts are required before a complete new set of cutting teeth come into service, a number of successive shifts are performed before shutting down the machine.

Turning now to the manner in which the control circuits of FIG. 15 operate, the D.-C. register pulse (produced as shown in FIG. 13) is supplied to the arm 143'' of the PN relay 143. If the gear is outside of the narrow tolerance the D.-C. pulse is supplied through line 205 to arm 153'' of the Pφ relay. If that relay indicates the gear is undersize, the D.-C. pulse passes through line 206 to arm 164' of the FN relay. If that relay indicates that the fillet is outside of the narrow tolerance, the D.-C. pulse is applied through line 207 to the "hob-out" stepping relay 208.

A brief digression to explain the manner in which the stepping relay functions will be helpful in understanding subsequent explanations. The movement of the switch arm 209 of the stepping relay is effected by a ratchet mechanism actuated by energization of the coil 208. Due to the ratchet mechanism, energization of the coil moves the ratchet but not the arm 209. When the coil is then de-energized, the arm 209 makes its step. Whenever arm 209 is off zero, switch 210 closes. This is indicated by a dash line connecting the two. Switch arm 211 moves to its lower position whenever the actuating coil 208 is energized, and to its upper position when de-energized. Resetting of the relay to zero is accomplished by stepping rapidly through the ten positions indicated and back to zero.

If a D.-C. pulse is applied through line 207 to the coil 208, with the relay in its zero position shown, arm 211 will move to its lower position but nothing further will happen until the D.-C. pulse terminates. Thereupon the coil 208 will be de-energized, arm 211 will return to its upper position, and the ratchet mechanism will cause arm 209 to step to its first position. This in turn causes switch 210 to close. Subsequent pulses in line 207 will cause the relay to step to successive positions.

If switch arm 209 is on one of its contacts, that is, off zero, the application of D.-C. to arm 211 will cause the relay to reset to zero, provided there is no D.-C. on line 207. In the resetting, the D.-C. on arm 211 passes through switch 210 (closed off-zero) and actuates coil 208. Actuation of the coil moves switch arm 211 to its lower position, thus breaking the circuit. This de-energizes coil 208 causing the relay to step once, and the arm 211 simultaneously returns to its upper position. The operation repeats until arm 209 has stepped to its zero position and switch 210 opens. The stepping action for reset is very fast and takes place well within the duration of the D.-C. register pulse.

Returning now to the actuation of the hob-out stepping relay 208 by a D.-C. register pulse through line 207, upon termination of the pulse the arm 209 moves to its first position labelled "1." If successive gears show the same defect, namely PN-NG, Pφ undersize, and FN-NG, the hob-out stepping relay will step to successive positions. When position 3 is reached, arm 209 sets up a circuit to line 212 leading to the hob-out relay 213. Arm 209 connects through line 214 to a switch 215 located in the hobbing machine. This switch is closed during the rapid traverse portion of hobbing machine cycle and hence supplies A.-C. from line 216, switch 215, etc., to the actuating coil of hob-out relay 213. The purpose of switch 215 is to prevent any adjustments of the hobbing machine while the hob is in engagement with the gear blank.

Upon energization of relay 213, A.-C. is supplied through contacts 213' to the hob-out line 217 which connects with suitable circuitry in the hobbing machine to move the hob out by the desired increment. If, despite this hob-out adjustment, gears exhibiting the same defect continue to arrive, hob-out stepping relay arm 209 will continue to step until it reaches contact 9, whereupon a circuit is set up through line 218, the closed contacts 219 of the shut down reset switch and the actuating coil of shut down relay 221. When switch 215 in the hobbing machine next closes, A.-C. is applied through the circuit to the shut down relay 221 and opens contacts 222 connected to the shut down circuits of the hobbing machine. In this embodiment it is assumed that the shut down circuits of the hobbing machine are such that the opening of contacts 222 will interrupt the current to the hobbing machine. For example, contacts 222 can be placed in series with a push button circuit which stops the hobbing machine.

It will be noted that contacts 3 and 4 of hob-out stepping relay 209 are tied together, and likewise contacts 9 and 10 are tied together. This is because in this particular embodiment the hobbing machine cuts two gears in one operation. If two pairs of gears produced by the hobbing machine all exhibit the same defect requiring a hob-out adjustment, the relay will step to contact 4 whole the hobbing machine is cutting gears 5 and 6. The hobbing machine can be adjusted only during the rapid traverse following the production of gears 5 and 6. Accordingly, it is necessary that contact 4 be connected to the hob-out relay 213. In this situation four gears showing the same defect are gaged before the hobbing machine is controlled. Under other circumstances, the first gear of a pair may be satisfactory but the second gear of that pair and both gears of the next pair may show the same defect requiring a hob-out adjustment. In such an event arm 209 will be on the third contact at the time the rapid traverse occurs and the hobbing machine can be adjusted.

The same reasoning applies to contacts 9 and 10.

If only single gears were produced in one hobbing operation, the tying together of these pairs of contacts would be unnecessary. Similarly, if more than two gears are produced at one time, additional contacts may be tied together. If it is desired to delay the adjustment signal until more than three (or four) gears are produced, suitable changes can be made in the connections to the contacts on the stepping relay, and more contacts can be employed if desired.

A circuit resulting in a hob-in signal will now be described. If the PN relay is in its NG position and the P$\phi$ relay is in its oversize position, the D.-C. register pulse will be supplied through line 223 to arm 145" of the PW relay. If the PW is OK, the pulse passes through line 224 to arm 165' of FW relay. If FW is OK, the pulse passes through line 225 to the actuating coil of the hob-in stepping relay 226, and the switch arm of this relay will step to position 1 upon termination of the pulse. Subsequent gears showing the same defects will result in subsequent movements of the stepping relay. Upon reaching contact 3 a circuit to the hob-in relay 227 will be set up. During the next closure of switch 215 during the rapid traverse, hob-in relay 227 will be energized and a hob-in signal supplied through line 228 to the hobbing machine. The operation of the hob-in circuit is like that of the hob-out circuit and need not be described further.

An example of a circuit resulting in a hob shift adjustment signal will now be traced. If the PN relay is in the OK position, the D.-C. register pulse will pass through line 229 to arm 164" on the FN relay. If this is in the NG position, the pulse will pass through the line 231 to arm 167" on the F$\phi$ relay. If F$\phi$ indicates oversize, the pulse will pass through line 232 to the lower deck of the hob-shift stepping relay 233.

Two decks on the hob-shift stepping relay and more complicated circuitry than for the hob-in or hob-out stepping relays are employed because it is desired to shift the hob whenever two successive gears indicate the need for a shift, regardless of whether the first or second gear of a pair produced by the hobbing machine is the initial bad one. It is also desired to repeat the hob shift for successive pairs of gears until a total of 10 is reached, whereupon the machine is shut down.

To this end, the lower deck 234 has contacts 0, 1, 3, 5, 7 and 9 tied together. The upper deck 235 has contacts 2, 4, 6 and 8 tied together. If the hob-shift relay 233 is in its zero position when a pulse is supplied to line 232, the pulse passes through contact 0 to the switch arm of lower deck 234 and line 236 to the actuating coil of relay 233, thereby causing the relay to step to its first position (contacts 1). The register pulse due to the next gear will pass through contact 1 to the switch arm of the lower deck and thence to the actuating coil 233 and cause the relay to step to contacts 2. The closing of contact 2 on the upper deck 235 sets up a circuit including line 237, switch 238 in the hobbing machine and the actuating coil of hob-shift relay 239 on the one hand, and through the switch arm, line 214 and switch 215 to the A.-C. line 216 on the other hand.

Assume that the two gears just measured were gears 1 and 2 simultaneously cut by the hobbing machine. While the measurements are being completed and the circuits set up as described, the machine is cutting gears 3 and 4. The hob cannot be shifted until the rapid traverse following the cutting of the latter gears. The rapid traverse will begin, however, before gaging gear 3 and accordingly switch 215 will be closed to energize hob shift relay 239 through the circuit set up. The closing of contacts 239" completes a circuit between hob shift lines 241. Appropriate electrical circuits are provided in the hobbing machine so that closing the circuit of lines 241 will initiate a hob shift.

The actuation of relay 239 also closes contacts 239', thus establishing a D.-C. circuit through line 236 to the hob-shift stepping relay 233 which bypasses the lower deck 234. When the hob shift begins, the switch 238 opens, thus breaking the circuit to hob-shift relay 239 and breaking contacts 239'. The breaking of the D.-C. circuit to relay 233 causes the relay to step to position 3 without requiring any additional gear measurements. If gear 3 proves to be bad, a pulse through line 232 and contact 3 of the lower deck 234 will be passed to the stepping relay coil 233 and upon termination of the pulse the relay steps to position 4. The upper deck then indicates the need for a hob shift, but such a shift cannot take place since the hobbing machine is cutting gears Nos. 5 and 6. Upon measurement of gear 4 and finding that gear bad, a pulse on line 232 cannot reach the actuating coil 233 since contact 4 on the lower deck is an open circuit. However, during the rapid traverse following the cutting of gears 5 and 6, the hob shift takes place and the closing of contacts 239' and subsequent opening thereof causes relay 233 to step to position 5.

If gear 4, upon measurement, proves not to require a hob shift, stepping relay 233 will be reset to zero, as will be explained hereinafter.

Assume now that gear 1, produced by the hobbing machine, was satisfactory but subsequent gears indicated the need for a hob shift. Stepping relay 233 will step to contact 1 for gear 2 and to contact 2 for gear 3, thus indicating the need for a hob shift by the closing of the circuit by the upper deck. The shift cannot take place, however, since the hobbin machine is cutting gears 5 and 6. If gear 4 is likewise bad, the relay cannot step since contact 2 on the lower deck 234 is open-circuited. This illustrates the value of the interconnections shown, since if a step took place upon measurement of gear 4 the contact arm of upper deck 235 would move to contact 3, which would not establish the hob shift circuit. During the rapid traverse following production of gears 5 and 6, actuation of shift relay 239 will cause relay 233 to step to position 3 and the sequence will continue.

The overall result is that two successive bad gears will cause hob-shift stepping relay 233 to step to the next position calling for a hob shift regardless of whether the bad gears begin with even or odd numbered gears produced by the hobbing machine. Upon arrival at contact 10 on upper deck 235, a shut down circuit is completed through line 218 in the manner described before.

If at any time during the examination of the gears a gear arrives which is within the narrow tolerance limits, any stepping relay which is off zero will be reset to zero. This operation takes place as follows: Assume that PN relay 143 and FN relay 164 are in their OK positions. The D.-C. register pulse will pass through line 229 to line 242 which is termed the "reset" line. The D.-C. pulse in the reset line will be applied to switch arm 211 of hob-out relay 208 and to corresponding switch arms of the other two stepping relays 226, 233. If any of the relays, for example the hob-out relay 208, is in its zero position, its corresponding switch 210 will be open and nothing will happen. However, if any relay is off zero, e.g. the hob-out relay 208, its corresponding switch 210 will be closed and the reset pulse will be applied to the actuating coil thereof. This causes arm 211 to move to its lower position, breaking the circuit, and the process is repeated until the relay has reset to zero, as described before.

A further feature of the embodiment shown is that if the hob-out relay 208 is off zero, and measurement of a subsequent gear indicates the need for a different type of adjustment, say a hob-in adjustment, the hob-out relay will be reset to zero but the hob-in relay will be actuated to its first position. Thus, consider that the hob-out relay 208 is off zero, thus closing switch 210. Now assume a hob-in signal to be applied to hob-in relay 226. This will cause switch arm 243 to move to its lower position and close a circuit between the reset line and line 244 which is connected to receive the D.-C. register pulse. Thus the D.-C. register pulse will be applied through arm 243 to the reset line and cause the resetting of hob-out relay 208. A similar action will take place if the hob-shift stepping relay were off zero rather than the hob-out relay. The overall result is that only one stepping relay can be off zero at any time. Actuation of a different relay will reset any relay which is off zero.

Upon actuation of shut down relay 221 as described hereinbefore, a holding circuit is established from the A.-C. line through the contacts 221' and the closed switch 219. At the same time the remaining sets of contacts on relay 221 supply plus D.-C. to the actuating coils of each of the stepping relays. Thus, no additional control signals can be developed. After suitable adjustments or repairs have been made on the hobbing machine, and operation is ready to be resumed, the reset switch 219 may be manually operated to its upper position. This will break the holding circuit for the shut down relay 221 and apply plus D.-C. to the reset line, thereby resetting all stepping relays to their initial positions. Operation can then be resumed.

A large number of different control circuits are set up by various combinations of the measuring relay positions. Rather than trace each of these circuits individually, the chart shown in FIG. 16 illustrates the overall effect of various combinations. From this chart any individual circuit can readily be traced.

Referring now to FIG. 16, dash lines 245 and 246 illustrate nominal pitch diameter and nominal root fillet settings. The actual dimensions which these lines represent are determined by the initial setting of the differential transformers, as explained hereinbefore. The vertical full lines represent the narrow tolerance and wide tolerance limits for pitch diameter. The actual tolerances can be set by adjusting the potentiometers in the PD detectors 129 and 131 (FIG. 13).

The horizontal solid lines represent narrow and wide tolerance limits for the fillet detectors 162, 163 (FIG. 13). A number of regions are formed by the intersecting tolerance lines which have been labelled 1 through 25 in FIG. 16, for convenience. The center region 13 represents the condition where both PD and root fillet are within narrow tolerance, thus requiring no control signal to be developed. Accordingly this region is labelled "OK." Other regions are labelled "I," meaning that if the relay positions fall within those regions a hob-in control signal is supplied to the hob-in stepping relay 226 (FIG. 15). The regions labelled "O" indicate a control signal is supplied to the hob-out stepping relay 208. The regions labelled "S" indicate that a control signal is supplied to the hob-shift stepping relay 233.

The diagonal full line 247 represents the relationship between variations in pitch diameter and root fillet which may be expected with a perfect hob. If the horizontal and vertical scales are alike, line 247 will be at 45°, as illustrated. The reason for this is that, with a perfect hob, any error in axial separation which produces a given oversize error in pitch diameter may be expected to give the same oversize error in root fillet, and similarly for undersize errors. If horizontal and vertical scales are different, the full line 247 would have a different slope.

As the hob wears, the root fillet will build up even though the axial separation is correct. Although the wear is at a maximum at the tips of the hob cutting tooth, some wear is present along the sides of the cutting teeth so that in general it is found that a change in root fillet due to hob wear is accompanied by a smaller change in pitch diameter. This condition is represented by the full line 248. As here shown, the change in pitch diameter due to hob wear is approximately one-third of the change in root fillet build-up. This ratio may vary in practice, depending upon many factors.

Use is made of the difference in slope between lines 247 and line 248 to determine whether a given discrepancy in the gears calls for a change in axial separation (either in or out) or a hob shift. If both adjustments are required, the difference in slopes is used to determine which change will be made first. To this end the narrow and wide tolerance limits are selected advantageously so that most errors requiring solely an in or out movement will fall in regions 5, 9, 17 and 21. Also, the narrow and wide tolerance limits are advantageously selected so that conditions requiring only a hob shift will in general fall in regions 4 or 8.

It is, of course, possible that errors observed in the produced gears will require both an in or out movement and a hob shift. Various points are shown in FIG. 16 to indicate different simple combinations requiring both types of adjustment. Dotted lines have been inserted to show the construction. For example, point 249 indicates a situation where two hob-in movements and a single hob shift are indicated to bring the operation back to the nominal values in region 13. From FIG. 16 it will be seen that these adjustments will occur in this sequence: hob-in, hob-shift, hob-in. Point 250 represents a condition where two hob-out movements and a single hob shift are indicated. With this explanation of selected points and the construction lines shown, it is believed that the types of adjustments indicated for the remaining points will be clear to those skilled in the art.

The manner in which the chart of FIG. 16 can be used to trace circuits in FIG. 15 may be briefly described. The circuits traced before for the hob-in movement correspond to region 9 in FIG. 16. The circuits traced before for a hob-shift movement correspond to region 8 in FIG. 16.

Consider now gaging indications falling in region 12, indicating that a hob-shift control signal will be produced. For this region the pitch diameter is under size but between the narrow and wide tolerance limits. The root fillet is within the narrow tolerance. Consequently in FIG. 15 PN relay 143 will be in its NG position, transmitting the D.-C. register pulse through line 205 to arm 153″ of the Pφ relay. That relay will be in its U position transmitting the pulse to arm 164′ of the FN relay. Since this relay will be in its OK position, the pulse will pass through line 251 and line 232 to the hob-shift stepping relay 233.

Taking region 4 in FIG. 16 as another example, this should result in a hob-shift signal. The region represents a PD oversize condition between narrow and wide tolerance limits and a fillet oversize condition outside the wide tolerance limit. Returning to FIG. 15, PN relay will be in its NG position passing the D.-C. register pulse through line 205 to arm 153″ of relay Pφ. This will be in its O position, passing the pulse through line 223 to arm 145″ of the PW relay. This relay will be in its OK position, passing the pulse through line 224 to arm 165′ of the FW relay. Being in its NG position, the pulse will then pass through line 253 to arm 167′ of the Fφ relay. This will be in its O position, passing the pulse through line 232 to the hob-shift stepping relay 233. If a second gear also falls in region 4, a hob shift will be effected in the hobbing machine. If nothing else has changed in the meantime, it is to be expected that the measurements of the next gear will fall in region 9. If three successive gears fall in region 9, a hob-in movement will be effected, as above described.

It is believed that the above tracing of circuits for selected regions of FIG. 16 will illustrate the manner in which circuits for other regions can be traced and that further detailed description is unnecessary.

It should be emphasized that the conditions represented by lines 247, 248 of FIG. 16 must be considered idealized due to the random variations in gears produced by a hobbing machine. Also, the slope of line 248 will depend upon many different factors. To meet varying operating conditions, the narrow and wide tolerances may be altered, and the tolerances selected for pitch diameter need not necessarily be the same as those selected for root fillet build-up. However, the overall logic of the circuitry of the present invention will be apparent from the discussion of FIG. 16. The specific manner in which the circuits have been arranged in the present embodiment have been found satisfactory under the conditions in which the apparatus has been used so far. However, if conditions arise such that it is desired to change the sequence of the shifting or in and out movements for any particular region, appropriate circuit connections can be made in the apparatus of FIG. 15.

Certain regions indicate the need for a double hob shift, or a double in or out movement, or combinations of the two. An example is region 12 which contains a point indicating the need for two hob shifts and two hob out movements, as well as a point indicating the need for a single hob shift and a single hob out movement. Additional tolerance detectors could be employed to take care of separating such points but have been found unnecessary at the present time. Also, even though the need for a double shift or double in or out movement is indicated by one or more gears, due to the random variations in hobbing machines, it is preferred to make only one adjustment at a time and then await further measurements to indicate the need for further adjustments. Generally speaking, the control circuits will tend to correct the operation of the hobbing machine sufficiently promptly so that few gears will require rejection due to their falling outside the wide tolerance limits.

With these considerations in mind, most defective gears will fall in regions 4, 8, 9, 12 and 17, with occasional gears falling in regions 5, 16 and 21. Regions 1, 2, 6, 7, 19, 20, 24, 25 represent conditions not likely to exist in a properly maintained hobbing machine. Accordingly, the control circuits corresponding to the latter regions could be eliminated if desired. Other regions represent conditions which, though not as extreme, also are unlikely to exist. Region 8 is considered particularly important since it indicates hob wear. Regions 9 and 17 are important since they correspond to single errors in axial separation with a good hob. Regions 4 and 12 represent combinations of hob wear and error in axial separation which are reasonably likely to be encountered. The conditions indicating the need for a hob shift are additionally important since continued use of a worn hob is highly undesirable.

Although it is preferred at the present time to combine both narrow tolerance and wide tolerance measurements for developing control signals, it may be sufficient in many applications to employ only narrow tolerance measurements for control purposes and employ wide tolerance measurements only for sorting purposes. The circuitry of FIG. 15 can be simplified to obtain this type of operation.

FIG. 17 shows one modification which can be employed if desired. In this figure, the relays PN, PW, Pφ, FN, FW and Fφ are actuated in the manner shown in FIG. 13. The sorting circuit beginning with the A.-C. register pulse and ending at salvageable or unsalvageable relays is the same as that shown in FIG. 15 and need not be described again.

The control circuits begin with the D.-C. register pulse which is applied to arm 143″ of the PN relay. If the gear is outside of the narrow tolerance the pulse passes through line 205 to arm 153″ of the phase relay. If undersize, the pulse passes to arm 164′ of the FN relay. If outside the narrow fillet tolerance, it passes through line 261 to arm 167′ of the Fφ relay. If undersize, it passes to line 207 leading to the hob-out stepping relay. Thus, if both PD and fillet are undersize, a hob-out adjustment is made.

If the Fφ relay indicates oversize, the pulse passes from arm 167′ to line 232 leading to the hob shift stepping relay.

If, with the PN relay outside of tolerance and the Pφ relay undersize, relay FN indicates that the fillet is satisfactory, arm 164′ supplies the pulse through line 207 to the hob-out stepping relay. If the PN relay indicates outside of tolerance and the Pφ relay indicates oversize, the pulse passes through line 262 to the hob-in stepping relay.

Returning to the PN relay, if that indicates within tolerance, the D.-C. register pulse passes to arm 164″ of the FN relay. If that indicates OK, the pulse passes through line 242 to reset all stepping relays. If the FN relay indicates NG, the pulse passes to arm 167″ of the Fφ relay. If that indicates undersize, the pulse passes to the reset line 242. If it indicates oversize, the pulse passes through line 232 to the hob-shift stepping relay.

The stepping relay circuits for FIG. 17 may be the same as those shown in FIG. 15 under similar conditions of operation of the hobbing machine.

In FIG. 17 as in FIG. 15, the arrival of a gear within both the narrow tolerances will result in resetting the stepping relays to zero. However, in general in FIG. 17, when a condition arises which might be due to either hob wear or erroneous axial separation, the axial separation is changed first. As discussed above in connection with FIG. 16, in some such instances the circuitry of FIG. 15 will first shift the hob. For example, if the pitch diameter is undersize and between narrow and wide tolerance limits, and the fillet is satisfactory, the condition is that of region 12 of FIG. 16 and accordingly the circuit of FIG. 15 would first shift the hob. However, under similar conditions the circuit of FIG. 17 would result in a hob-out signal. This indicates how the circuitry can be rearranged to give precedence to one type of change over the other to meet operating conditions.

FIG. 1 shows lights 23 actuated to inform the operator of the various types of defects being detected. Additional decks on stepping relays 208, 226 and 233 may be employed to energize a corresponding light whenever the respective relay is off zero. Another light, say red, can be connected to be illuminated whenever the shut-down relay 221 is energized. The fifth light, say green, can be connected to be energized whenever the relays PN and FN are in their OK positions, thus indicating that the gear just measured falls within the narrow tolerances.

Many modifications are possible in the specific embodiments described herein, either at the option of the designer or to meet the conditions of a particular application. Also, selected features described herein may be employed and others omitted. A few possible modifications may be mentioned, and many others will occur to those skilled in the art.

Modification of the adjustment circuits to meet the requirements of the particular hobbing machine, or other machine tool being controlled, can be made as required. In the specific embodiment shown in FIG. 15, the hob-in and hob-out adjustment circuits are energized with A.-C. to effect the respective adjustment of the hobbing machine, whereas the hob-shift circuit operates by short-circuiting a suitable control circuit in the hobbing machine. Either type of operation may be employed as meets the requirements of the hobbing machine, and it will be understood that in both cases an adjustment signal may be considered to be applied to the hobbing machine. Switches 215 and 238, here shown as physically located in the hobbing machine, may be placed in the control unit and actuated by suitable signals from the hobbing machine.

In the control of machine tools other than hobbing machines, the adjustments made on the machine tool may be selected to correspond to the defects observed in the output pieces therefrom.

The use of a separate cam-operated switch unit 5–10 in the apparatus of FIG. 5, driven by shift 54 through gears, a chain drive, etc., often facilitates pre-assembly. Also, while it is preferred to employ stepping relays as counting units, various forms of electronic counters may be employed if desired. The electronic circuits in the gaging unit, including the amplitude and phase detectors, may also be modified as desired, and transducers other than the preferred differential transformers may be employed if desired.

We claim:

1. Apparatus for gaging gears produced by a hobbing machine and controlling said machine which comprises gaging means for separately gaging variations in substantially the pitch diameter and the clearance curve of a gear and yielding different indications for within-tolerance and outside-of-tolerance conditions of the pitch diameter and clearance curve respectively, circuit means for setting up alternatively for different combinations of said indications a plurality of control circuits corresponding to different adjustments of said hobbing machine, and means for utilizing said control circuits to effect corresponding adjustments of said hobbing machine.

2. Apparatus for gaging gears produced by a hobbing machine and controlling said machine which comprises gaging means for separately gaging variations in substantially the pitch diameter and the clearance curve of a gear and yielding different indications for within-tolerance and outside-of-tolerance conditions of the pitch diameter and clearance curve respectively, said indications including an indication of clearance curve oversize, circuit means for setting up alternatively for different combinations of said indications a plurality of control circuits corresponding to different adjustments of said hobbing machine, at least one of said combinations setting up a hob-shift control circuit when the pitch diameter indication is within-tolerance and the clearance curve indication is outside-of-tolerance and oversize, and means for utilizing said control circuits to effect corresponding adjustments of said hobbing machine.

3. Apparatus for gaging gears produced by a hobbing machine and controlling said machine which comprises gaging means for separately gaging variations in substantially the pitch diameter and the clearance curve of a gear and yielding different indications for within-tolerance and outside-of-tolerance conditions of the pitch diameter and clearance curve respectively, circuit means for setting up alternatively for different combinations of said indications a plurality of control circuits corresponding to different adjustments of said hobbing machine, a plurality of storage means actuated through said control circuits respectively, each said storage means being adapted to set up a respective adjustment circuit only after a plurality of actuations thereof, and means for utilizing said adjustment circuits to effect corresponding adjustments of said hobbing machine.

4. Apparatus for gaging gears produced by a hobbing machine and controlling said machine which comprises gaging means responsive to variations in substantially the pitch diameter and clearance curve of a gear and adapted to yield different indications for within-tolerance and outside-of-tolerance conditions of the pitch diameter and clearance curve respectively, circuit means utilizing said indications to set up alternatively for different combinations of said indications a plurality of control circuits corresponding to different adjustments of said hobbing machine, a plurality of counters actuated through said control circuits respectively, means for actuating each counter successively when the respective control circuit is set up by the gaging of sucessive gears, connections to said counters for reducing the count of an actuated counter upon actuation of another counter to an increased count, a plurality of adjustment circuits set up by said counters only after a plurality of counts thereby, respectively, and means for utilizing said adjustment circuits to effect corresponding adjustments of said hobbing machine.

5. Apparatus for gaging gears produced by a hobbing machine and controlling said machine which comprises gaging means for separately gaging variations in substantially the pitch diameter and the clearance curve of a gear and yielding different indications for within-tolerance and outside-of-tolerance conditions of the pitch diameter and clearance curve respectively, circuit means for setting up alternatively for different combinations of said indications a plurality of control circuits corresponding to different adjustments of said hobbing machine, a plurality of counters actuated through said control circuits respectively, cycling means coordinated with the gaging of successive gears for actuating said counters in accordance with the respective control circuits set up, connections to said counters for reducing the count of an actuated counter upon actuation of another counter to an increased count, circuit means responsive to within-tolerance conditions for reducing the count of an actuated counter, a plurality of adjustment circuits set up by said counters only after a plurality of counts thereby, respectively, and means for utilizing said adjustment circuits to effect corresponding adjustments of said hobbing machine.

6. Apparatus for gaging gears produced by a hobbing machine and controlling said machine which comprises gaging means responsive to variations in substantially the pitch diameter and clearance curve of a gear and adapted to yield different indications for within-tolerance and outside-of-tolerance conditions of the pitch diameter and clearance curve respectively, circuit means utilizing said indications to set up alternatively for different combinations of said indications a plurality of control circuits corresponding to different adjustments of said hobbing machine, a plurality of counters actuated through said control circuits respectively, means for actuating each counter successively when the respective control circuit is set up by the gaging of successive gears, connections to said counters for reducing the count of an actuated counter upon actuation of another counter to an increased count, a plurality of adjustment circuits set up by said counters after a predetermined plurality of counts thereby, respectively, means for utilizing said adjustment circuits to effect corresponding adjustments of said hobbing machine, and a shutdown circuit for said hobbing machine set up by at least one of said counters upon counting a predetermined number of counts beyond the respective plurality of counts.

7. Apparatus for gaging gears produced by a hobbing machine and controlling said machine which comprises gaging means responsive to variations in substantially the pitch diameter and clearance curve of a gear and adapted to yield different indications for predetermined within-tolerance and outside-of-tolerance conditions of the pitch diameter and clearance curve respectively and oversize and undersize conditions thereof, circuit means utilizing said indications to set up alternatively for different combinations of said indications a plurality of control circuits corresponding to different adjustments of said hobbing machine, said control circuits including hob-in and hob-out circuits set up by pitch diameter and clearance curve indications outside-of-tolerance and oversize or undersize respectively, a plurality of counters actuated through said hob-in and hob-out circuits respectively, means for actuating each counter successively when the respective control circuit is set up by the gaging of successive gears, connections to said counters for reducing the count of an actuated counter upon actuation of another counter to an increased count, a plurality of adjustment circuits set up by said counters only after a plurality of counts thereby, respectively, and means for utilizing said adjustment circuits to effect corresponding adjustments of said hobbing machine.

8. Apparatus for gaging gears produced by a hobbing machine and controlling said machine which comprises gaging means responsive to variations in substantially the pitch diameter and root fillet of a gear and adapted to yield different indications for within-tolerance and outside-of-tolerance conditions of the pitch diameter and root fillet respectively, circuit means utilizing said different pitch diameter and root fillet indications to set up alternatively for different combinations of said indications a plurality of different control circuits predetermined to correspond to different adjustments of said hobbing machine, a plurality of storage means actuable through said control circuits respectively, each of said storage means being actuable from an initial condition to a plurality of successive conditions by successive actuations thereof, cycling means coordinated with the gaging of successive gears for actuating said storage means in accordance with the respective control circuits set up, reset means responsive to actuation of one storage means from the initial condition thereof to reset another actuated storage means to the initial condition thereof, reset means responsive to within-tolerance indications to reset an actuated storage means to the initial condition thereof, a plurality of adjustment circuits, set up by said storage means respectively upon actuation of the respective storage means to a plurality of successive conditions, and means for utilizing said adjustment circuits to effect corresponding adjustments of said hobbing machine.

9. Apparatus for gaging gears produced by a hobbing machine and controlling said machine which comprises gaging means responsive to variations in substantially the pitch diameter and the root fillet of a gear and adapted to yield different indications for within-tolerance, undersize and oversize conditions of the pitch diameter and root fillet respectively, circuit means utilizing said different pitch diameter and root fillet indications to set up alternatively for different combinations of said indications a plurality of different control circuits predetermined to correspond to hob-in, hob-out and hob-shift adjustments of said hobbing machine, a plurality of counting means actuable through said control circuits respectively, each of said counting means being actuable from an initial condition to a plurality of successive conditions by successive actuations thereof, cycling means coordinated with the gaging of successive gears for actuating said counting means in accordance with the respective control circuits set up, reset means responsive to actuation of one counting means from the initial condition thereof to reset another actuated counting means to the initial condition thereof, reset means responsive to within-tolerance indications to reset an actuated counting means to the initial condition thereof, hob-in, hob-out, and hob-shift adjustment circuits set up by respective counting means upon actuation thereof to a plurality of successive conditions, and means for utilizing said adjustment circuits to effect corresponding adjustments of said hobbing machine.

10. Apparatus for gaging gears produced by a hobbing machine and controlling said machine which comprises gaging means responsive to variations in substantially the pitch diameter and root fillet of a gear and adapted to yield different indications for within-narrow-tolerance, outside-narrow-tolerance, outside-wide-tolerance and oversize and undersize conditions of the pitch diameter and root fillet respectively, circuit means utilizing said different pitch diameter and root fillet indications to set up alternatively for different combinations of said indications a plurality of different control circuits predetermined to correspond to hob-in, hob-out and hob-shift adjustments of said hobbing machine and to within-narrow-tolerances respectively, said combinations including the combinations represented by regions 8, 9, 12, 13, 17 in FIG. 16 of the drawings and setting up respective control circuits in accordance with the letters in the respective regions wherein "I," "O," "S" and "OK" denote hob-in, hob-out, hob-shift and within-narrow-tolerances respectively, a plurality of counting means actuable through said control circuits respectively, each of said counting means being actuable from an initial condition to a plurality of successive conditions by successive actuations thereof, cycling means coordinated with the gaging of successive gears for actuating said counting means in accordance with the respective control circuits set up, reset means responsive to actuation of one counting means from the initial condition thereof to reset another actuated counting means to the initial condition thereof, reset means actuated through the within-narrow-tolerances circuit for resetting an actuated counting means to the initial condition thereof, hob-in, hob-out, and hob-shift adjustment circuits set up by respective counting means upon actuation thereof to a plurality of successive conditions, and means for utilizing said adjustment circuits to effect corresponding adjustments of said hobbing machine.

11. Apparatus for gaging gears produced by a hobbing machine and controlling said machine which comprises gaging means for separately gaging variations in substantially the pitch diameter and the clearance curve of a gear and yielding different indications for within-tolerance and outside-of-tolerance conditions of the pitch diameter and clearance curve respectively, a plurality of relays actuated in accordance with said different indications, interconnections between contacts of said relays for setting up alternatively for different combinations of said pitch diameter and clearance curve indications a plurality of control circuits corresponding to different adjustments of said hobbing machine, and means for utilizing said control circuits to effect corresponding adjustments of said hobbing machine.

12. Apparatus for gaging gears produced by a hobbing machine and controlling said machine which comprises gaging means for separately gaging variations in substantially the pitch diameter and the clearance curve of a gear and yielding different indications for within-tolerance and outside-of-tolerance conditions of the pitch diameter and clearance curve respectively, a plurality of relays actuated in accordance with said different indications, interconnections between contacts of said relays for setting up respective control circuits corresponding to different adjustments of said hobbing machine, a plurality of stepping relays actuated through said control circuits respectively, connections to contacts of each stepping relay for setting up a respective adjustment circuit only after a plurality of steps thereby, and means for utilizing said adjustment circuits to effect corresponding adjustments of said hobbing machine.

13. Apparatus for gaging gears produced by a hobbing machine and controlling said machine which comprises gaging means responsive to variations in substantially the pitch diameter and clearance curve of a gear and adapted to yield different indications for within-tolerance and outside-of-tolerance conditions of the pitch diameter and clearance curve respectively, a plurality of relays actuated in accordance with said different indications, interconnections between contacts of said relays to set up alternatively for different combinations of said pitch diameter and clearance curve indications a plurality of control circuits corresponding to different adjustments of said hobbing machine, a plurality of stepping relays actuated through said control circuits respectively, connections to contacts of each stepping relay for setting up a respective adjustment circuit only after a plurality of steps thereby, connections to said stepping relays for stepping back a stepped relay upon stepping of another relay to a further step, connections between said stepping relays and contacts of the first-mentioned relays representing within-tolerance conditions for stepping back a stepped relay, and means for utilizing said adjustment circuits to effect corresponding adjustments of said hobbing machine.

14. Apparatus for gaging gears produced by a hobbing machine and controlling said machine which comprises gaging means responsive to variations in substantially the pitch diameter and clearance curve of a gear and adapted to yield different indications for within-tolerance and outside-of-tolerance conditions of the pitch diameter and clearance curve respectively, a plurality of relays actuated in accordance with said different indications, interconnections between contacts of said relays to set up alternatively for different combinations of said indications a plurality of different control circuits predetermined to correspond to different adjustments of said hobbing machine, a plurality of stepping relays connected to be actuable through said control circuits respectively, cycling means coordinated with the gaging of successive gears for actuating said stepping relays in accordance with the respective control circuits set up, connections to contacts of said stepping relays for setting up respective adjustment circuits only after a plurality of steps by the respective relays, reset connections to said stepping relays for resetting a stepped relay to the initial position thereof upon stepping of another relay from the initial position thereof, reset connections responsive to within-tolerance indications for resetting stepped relays to the initial position thereof, and means for utilizing said adjustment circuits to effect corresponding adjustments of said hobbing machine.

15. Apparatus for gaging gears produced by a hobbing machine and controlling said machine which comprises gaging means responsive to variations in substantially the pitch diameter and the clearance curve of a gear and adapted to yield different indications for within-narrow-tolerance, outside-narrow-tolerance, outside-wide-tolerance and oversize and undersize conditions of the pitch diameter and clearance curve respectively, a plurality of relays actuated in accordance with said different indications, interconnections between contacts of said relays to set up alternatively for different combinations of said indications a plurality of different control circuits predetermined to correspond to hob-in, hob-out and hob-shift adjustments of said hobbing machine, at least one of said combinations setting up a hob-shift control circuit when the clearance curve indication is within-narrow-tolerance and the pitch diameter is undersize with respect to the narrow tolerance, a plurality of stepping relays connected to be actuable through said control circuits respectively, cycling means coordinated with the gaging of successive gears for actuating said stepping relays in accordance with the respective control circuits set up, connections to contacts of said stepping relays for setting up respective adjustment circuits only after a plurality of steps by the respective relays, reset connections to said stepping relays for resetting a stepped relay to the initial position thereof upon stepping of another relay from the initial position thereof, reset connections responsive to within-narrow-tolerance indications for resetting stepped relays to the initial position thereof, and means for utilizing said adjustment circuits to effect corresponding adjustments of said hobbing machine.

16. Apparatus for gaging gears produced by a hobbing machine and controlling said machine which comprises gaging means responsive to variations in substantially the pitch diameter and root fillet of a gear and adapted to yield different indications for within-narrow-tolerance, outside-narrow-tolerance, outside-wide-tolerance and oversize and undersize conditions of the pitch diameter and root fillet respectively, a plurality of relays actuated in accordance with said different indications, interconnections between contacts of said relays to set up alternatively for different combinations of said indications a plurality of different control circuits predetermined to correspond to hob-in, hob-out and hob-shift adjustments of said hobbing machine and to within-narrow-tolerances respectively, said combinations including the combinations represented by regions 4, 5, 8, 9, 12, 13, 16, 17, 21 in FIG. 16 of the drawings and setting up respective control circuits in accordance with the letters in the respective regions wherein "I," "O," "S" and "OK" denote hob-in, hob-out, hob-shift and within-narrow-tolerances respectively, a plurality of stepping relays connected to be actuable through said control circuits respectively, cycling means coordinated with the gaging of successive gears for actuating said stepping relays in accordance with the respective control circuits set up, connections to contacts of said stepping relays for setting up respective adjustment circuits only after a plurality of steps by the respective relays, reset connections to said stepping relays for resetting stepped relays to the initial position thereof upon stepping of another relay from the initial position thereof, reset connections actuated through the within-narrow-tolerances circuit for resetting stepped relays to the initial position thereof, and means for utilizing said adjustment circuits to effect corresponding adjustments of said hobbing machine.

17. Apparatus for gaging gears produced by a hobbing machine and controlling said machine which comprises gaging means responsive to variations in substantially the pitch diameter and the clearance curve of a gear and adapted to yield different indications for within-tolerance, undersize and oversize conditions of the pitch diameter and clearance curve respectively, a plurality of relays actuated in accordance with said different indications, interconnections between contacts of said relays to set up alternatively for different combinations of said indications a plurality of different control circuits predetermined to correspond to hob-in, hob-out and hob-shift adjustments of said hobbing machine, hob-in, hob-out and hob-shift stepping relays connected to be actuated through said control circuits respectively, cycling means coordinated with the gaging of successive gears for supplying actuating signals to said stepping relays in accordance with the respective control circuits set up, connections to contacts of said hob-in and hob-out stepping relays for setting up respective adjustment circuits only after a plurality of steps by the respective relays, means for utilizing said adjustment circuits to effective corresponding hob-in and hob-out adjustments of said hobbing machine, first and second switch arms simultaneously actuated by said hob-shift stepping relay and corresponding first and second sets of switch contacts, said hob-shift stepping relay stepping from one contact position to the next at the termination of an actuating signal applied to the actuating coil thereof, said cycling means supplying a hob-shift signal to the zero and a plurality of odd-numbered contacts in said first set, a connection from the first switch arm to said actuating coil, connections joining a plurality of even-numbered contacts of said second set, a hob-shift relay having an actuating coil, a series circuit including said second switch arm, said even-numbered contacts, said hob-shift relay coil, a switch normally closed but opened when a hob shift begins, a switch normally open but closed in the interval the hob is out of engagement with the workpiece, and a source of power, connections to contacts of said hob-shift relay for initiating a hob shift and for energizing the hob-shift stepping relay coil when the hob-shift relay coil is energized, reset connections to said stepping relays for resetting a stepped relay to the initial position thereof upon stepping of another relay from the initial position thereof, and reset connections responsive to within-tolerance indications for resetting stepped relays to the initial position thereof.

18. Apparatus for gaging gears produced by a hobbing machine and controlling said machine which comprises gaging means responsive to variations in substantially the pitch diameter and root fillet of a gear and adapted to yield different indications for within-narrow-tolerance, outside-narrow-tolerance, outside-wide-tolerance and oversize and undersize conditions of the pitch diameter and root fillet respectively, a plurality of relays actuated in accordance with said different indications, inter-connections between contacts of said relays to set up sorting circuits corresponding to outside-wide-tolerance and undersize pitch diameter and to, alternatively, at least one of the outside-wide-tolerance pitch diameter and root fillet indications oversize but the outside-wide-tolerance pitch diameter indication not undersize, gear sorting means actuated through said circuits, interconnections between contacts of said relays to set up hob-in, hob-out, hob-shift and within-narrow-tolerances control circuits corresponding to regions 4, 5, 8, 9, 12, 13, 16, 17, 21 in FIG. 16 of the drawings in which "I," "O," "S," and "OK" denote hob-in, hob-out, hob-shift and within-narrow-tolerances respectively, a plurality of stepping relays connected to be actuable through said control circuits respectively, cycling means coordinated with the gaging of successive gears for actuating said stepping relays in accordance with the respective control circuits set up, connections to contacts of said stepping relays for setting up respective adjustment circuits only after a plurality of steps by the respective relays, reset connections to said stepping relays for resetting stepped relays to the initial position thereof upon stepping of another relay from the initial position thereof, reset connections actuated through the within-narrow-tolerance circuit for resetting stepped relays to the initial position thereof, and means for utilizing said adjustment circuits to effect corresponding adjustments of said hobbing machine.

19. Apparatus for gaging gears produced by a hobbing machine and controlling said machine which comprises gaging means for gaging variations from a nominal value in substantially the clearance curve of a gear and yielding different indications for within-tolerance and outside-of-tolerance conditions thereof, circuit means utilizing said indications for setting up a hob-shift control circuit, and means for utilizing said control circuit to effect a shift of the hob in said hobbing machine.

20. Apparatus for gaging gears produced by a hobbing machine and controlling said machine which comprises gaging means for gaging variations from a nominal value in substantially the root fillets of gears being gaged and yielding different indications for within-tolerance and otuside-of-tolerance conditions thereof, circuit means for setting up a hob-shift control circuit, said circuit means utilizing said indications in a predetermined manner in setting up said circuit, and means for utilizing said control circuit to effect a shift of the hob in said hobbing machine.

21. Apparatus for gaging gears produced by a hobbing machine and controlling said machine which comprises gaging means for gaging variations in substantially the clearance curve of a gear and yielding different indications for within-tolerance and outside-of-tolerance conditions thereof, circuit means utilizing said indications for setting up a hob-shift control circuit, counting means actuated through said control circuit, and connections to said counting means for setting up a hob-shift adjustment circuit only after a plurality of counts thereby.

22. Apparatus for gaging gears produced by a hobbing machine and controlling said machine which comprises gaging means for gaging variations from a nominal value in substantially the root fillets of gears being gaged and yielding different indications for within-tolerance and outside-of-tolerance conditions thereof, relay means actuated in accordance with said different indications, circuit means for setting up a hob-shift control circuit, connections in said circuit means including contacts on said relay means whereby indications as to root fillet participate in setting up said control circuit, counting means actuated through said control circuit, and connections to said counting means for setting up a hob-shift adjustment circuit only after a plurality of counts thereby corresponding to the gaging of different gears.

23. Apparatus for gaging gears produced by a hobbing machine and controlling said machine which comprises gaging means for separately gaging variations in substantially the pitch diameter and the clearance curve of a gear and yielding different indications for within-narrow-tolerance, outside-narrow-tolerance, outside-wide-tolerance and oversize and undersize conditions of the pitch diameter and clearance curve respectively, circuit means utilizing said indications for setting up a hob-shift control circuit when the pitch diameter indication is oversize between narrow and wide tolerances thereof and the clearance curve indication is oversize outside the wide tolerance thereof and when, alternatively, the pitch diameter indication is undersize with respect to the narrow tolerance thereof and the clearance curve is within the narrow tolerance thereof, and means for utilizing said hob-shift control circuit to set up a hob-shift adjustment circuit for said hobbing machine.

24. In apparatus for gaging gears produced by a hobbing machine of the type which cuts two gears in a single feed of the hob, the combination which comprises gaging means for gaging gears successively immediately after being cut by said hobbing machine, circuit means connected with said gaging means for producing hob-shift control signals in response to predetermined gaging indications and at least one other control signal in response to other gaging indications, a stepping relay having simultaneously actuated first and second switch arms and respective first and second sets of switch contacts, said stepping relay being designed and constructed to step from one contact to the next adjacent contact at the termination of an actuating pulse applied to the actuation coil thereof, connections supplying said hob-shift control signals to the zero and a plurality of odd-numbered contacts in said first set, a connection from the first switch arm to said actuating coil, connections joining a plurality of even-numbered contacts of said second set, a hob-shift relay having an actuating coil, a series circuit including said second switch arm, said even-numbered contacts, said hob-shift relay coil, a switch normally closed but opened when a hob shift begins, a switch normally open but closed in the interval the hob is out of engagement with the workpiece, and a source of power, connections to contacts on said hob-shift relay for initiating a hob-shift and for energizing the actuating coil of said stepping relay when the hob-shift relay coil is energized, and means responsive to said other control signal for resetting said stepping relay to zero.

25. Apparatus for gaging output gears from a machine tool and controlling said machine which comprises gaging means for separately gaging variations from predetermined nominal values in substantially the pitch diameter and in substantially the clearance curve of gears being gaged and yielding different indications for within-tolerance and outside-of-tolerance conditions of said pitch diameter and clearance curve respectively, circuit means utilizing pitch diameter and clearance curve indications for setting up a plurality of alternative control circuits for different combinations of said indications corresponding to different adjustments of said machine tool, and means for utilizing said control circuits to effect corresponding adjustments of said machine tool.

26. Apparatus for gaging output gears from a machine tool and controlling said machine which comprises gaging means for separately gaging variations from predetermined nominal values in substantially the pitch diameter and in substantially the clearance curve of gears being gaged and yielding different indications for within-tolerance and outside-of-tolerance conditions of said pitch diameter and clearance curve respectively, circuit means utilizing pitch diameter and clearance curve indications for setting up a plurality of alternative control circuits for different combinations of said indications corresponding to different adjustments of said machine tool, a plurality of storage means actuated through said control circuits respectively, each said storage means being adapted to set up a respective adjustment circuit only after a plurality of actuations thereof, and means for utilizing said adjustment circuits to effect corresponding adjustments of said machine tool.

27. Apparatus for gaging output gears from a machine tool and controlling said machine which comprises gaging means responsive to variations from predetermined nominal values in substantially the pitch diameter and substantially the clearance curve of gears being gaged and adapted to yield different indications for within-tolerance and outside-of-tolerance conditions of said pitch diameter and clearance curve respectively, circuit means utilizing pitch diameter and clearance curve indications to set up a plurality of alternative control circuits for different combinations of said indications predetermined to correspond to different adjustments of said machine tool, a plurality of counters actuable by said control circuits respectively, cycling means coordinated with the gaging of successive gears for actuating said counters in accordance with the respective control circuits set up, means responsive to actuation of one counter for reducing the count of another previously actuated counter, means responsive to within-tolerance indications to reduce the count of a previously actuated counter, a plurality of adjustment circuits set up by said counters respectively upon a plurality of counts thereby, and means for utilizing said adjustment circuits to effect corresponding adjustments of said machine tool.

28. Apparatus for gaging output gears from a machine tool and controlling said machine which comprises gaging means responsive to variations from predetermined nominal values in substantially the pitch diameter and substantially the root fillet of gears being gaged and adapted to yield different indications for within-tolerance and outside-of-tolerance conditions of said pitch diameter and root fillet respectively, a plurality of relays actuated in accordance with said different indications, interconnections between contacts of said relays to set up a plurality of alternative control circuits for different combinations of pitch diameter and root fillet indications predetermined to correspond to different adjustments of said machine tool, a plurality of stepping relays connected to be actuable through said control circuits respectively, cycling means coordinated with the gaging of successive gears for actuating said stepping relays in accordance with the respective control circuits set up, connections to contacts of said stepping relays for setting up respective adjustment circuits only after a plurality of steps by the respective relays, reset connections to said stepping relays for resetting a stepped relay to the initial position thereof upon stepping of another relay from the initial position thereof, reset connections responsive to within-tolerance indications for resetting a stepped relay to the initial position thereof, and means for utilizing said adjustment circuits to effect corresponding adjustments of said machine tool.

29. Apparatus for gaging output pieces of a machine tool and controlling the machine tool which comprises gaging means for separately gaging variations from predetermined nominal values of at least two dimensions of said output pieces and yielding different indications for within-tolerance and outside-of-tolerance conditions of said two dimensions respectively, circuit means utilizing said indications for setting up a plurality of different control circuits for different combinations of said indications predetermined to correspond to different adjustments of said machine tool, and means for utilizing said control circuits to effect corresponding adjustments of said machine tool.

30. Apparatus for gaging output pieces of a machine tool and controlling the machine tool which comprises gaging means responsive to variations from predetermined nominal values of at least two dimensions of said output pieces and adapted to yield different indications for within-tolerance and outside-of-tolerance conditions of said two dimensions respectively, circuit means utilizing said indications to set up a plurality of different control circuits for different combinations of said indications predetermined to correspond to different adjustments of said machine tool, a plurality of storage means actuable by said control circuits respectively, each of said storage means being actuable from an initial condition to a plurality of successive conditions by successive actuations thereof, cycling means coordinated with the gaging of successive output pieces for actuating said storage means in accordance with the respective control circuits set up, reset means responsive to actuation of one storage means from the initial condition thereof to reset another actuated storage means to the initial condition thereof, reset means responsive to within-tolerance indications to reset an actuated storage means to the initial condition thereof, a plurality of adjustment circuits set up by said storage means upon actuation thereof to a plurality of successive conditions, respectively, and means for utilizing said adjustment circuits to effect corresponding adjustment of said machine tool.

31. Apparatus for gaging output pieces of a machine tool and controlling the machine tool which comprises gaging means responsive to variations from predetermined nominal values of at least two dimensions of said output pieces and adapted to yield different indications for within-tolerance and outside-of-tolerance conditions of said two dimensions respectively, switching means responsive to said indications and adapted to set up a plurality of different control circuits for different combinations of said indications predetermined to correspond to different adjustments of said machine tool, a plurality of counters actuable by said control circuits respectively, cycling means coordinated with the gaging of successive output pieces for actuating said counters in accordance with the respective control circuits set up, connections to said counters for setting up respective adjustment circuits only after a plurality of counts by the respective counter, reset connections to said counters for resetting an actuated counter to the initial position thereof upon actuation of another counter, reset connections responsive to within-tolerance conditions for resetting an actuated counter to the initial position thereof, and means for utilizing said adjustment circuits to effect corresponding adjustments of said machine tool.

References Cited in the file of this patent

UNITED STATES PATENTS

| | | |
|---|---|---|
| 1,642,077 | McIntosh | Sept. 13, 1927 |
| 2,042,257 | Harrison et al. | May 26, 1936 |
| 2,046,506 | Drader | July 7, 1936 |
| 2,101,183 | Lawton | Dec. 7, 1937 |
| 2,389,815 | Ransome | Nov. 27, 1945 |
| 2,390,012 | Timm et al. | Nov. 27, 1945 |
| 2,445,402 | Malmberg | July 20, 1948 |
| 2,664,557 | Sargrove | Dec. 29, 1953 |
| 2,690,701 | Zimmermann et al. | Oct. 5, 1954 |
| 2,692,045 | Stalhandske | Oct. 19, 1954 |
| 2,761,560 | Pomernacki | Sept. 4, 1956 |
| 2,789,759 | Tootill et al. | Apr. 23, 1957 |
| 2,877,895 | Drader | Mar. 17, 1959 |
| 2,940,365 | Drader | June 14, 1960 |

OTHER REFERENCES

Periodical, "Automation," April 1955, pp. 47–53.